United States Patent
Kaneko et al.

(10) Patent No.: US 8,234,474 B2
(45) Date of Patent: *Jul. 31, 2012

(54) METHOD OF CONSTRUCTING REPLICATION ENVIRONMENT AND STORAGE SYSTEM

(75) Inventors: Satoshi Kaneko, Yokohama (JP); Nobuhiro Maki, Yokohama (JP); Hironori Emaru, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/213,772

(22) Filed: Aug. 19, 2011

(65) Prior Publication Data

US 2011/0307596 A1    Dec. 15, 2011

Related U.S. Application Data

(63) Continuation of application No. 12/272,305, filed on Nov. 17, 2008, now Pat. No. 8,024,536.

(30) Foreign Application Priority Data

Sep. 24, 2008   (JP) ................................. 2008-244216

(51) Int. Cl.
G06F 12/16 (2006.01)
(52) U.S. Cl. ........................................ 711/162; 711/161
(58) Field of Classification Search .................... None
See application file for complete search history.

(56) References Cited

U.S. PATENT DOCUMENTS

| | | | |
|---|---|---|---|
| 7,206,912 B2 | 4/2007 | Mikami | |
| 7,549,027 B1 | 6/2009 | McAndrews et al. | |
| 8,024,536 B2 * | 9/2011 | Kaneko et al. | 711/162 |
| 2003/0188218 A1 | 10/2003 | Lubbers et al. | |
| 2005/0088976 A1 | 4/2005 | Chafle et al. | |
| 2006/0107098 A1 * | 5/2006 | Maki et al. | 714/6 |
| 2006/0161732 A1 | 7/2006 | Murotani et al. | |
| 2008/0092053 A1 | 4/2008 | Fujibayashi | |
| 2008/0126437 A1 | 5/2008 | Chiba | |
| 2011/0078395 A1 * | 3/2011 | Okada et al. | 711/162 |

FOREIGN PATENT DOCUMENTS

JP   2005-011311   1/2005

* cited by examiner

*Primary Examiner* — Than Nguyen
(74) *Attorney, Agent, or Firm* — Foley & Lardner LLP

(57) ABSTRACT

A management computer collects a usage condition of a volume from a host computer and a storage apparatus at each site, consolidates management thereof, and prevents a volume from duplicating among applications as a copy source. This makes it possible to select a used volume in an application as a copy source without excess or deficiency and to create a copy pair configuration definition without duplication or incompatibility. If a replication environment is constructed in a large-scale storage system, the consolidated management of a usage condition of a volume collected from the host computer and the storage apparatus at each site makes it possible to create a copy pair configuration definition by a task constituted by a plurality of applications.

14 Claims, 18 Drawing Sheets

FIG.5

Application configuration table 1280

| Application | Volume used by the application | |
|---|---|---|
| AP1 | VOL1 | ~5010 |
| AP2 | VOL2 | ~5020 |
| AP3 | VOL2、VOL3 | ~5030 |

Application configuration table 1142

| Application | Site | Host | Volume used by the application | |
|---|---|---|---|---|
| AP1 | Site A | Host A | VOL1 | ~5210 |
| AP2 | Site A | Host A | VOL2 | ~5220 |
| AP3 | Site A | Host A | VOL2、VOL3 | ~5230 |

5300, 5350, 5400, 5450

FIG.7A
Primary site volume configuration table 1144A

| # | Primary site volume | Application which is using a volume | |
|---|---|---|---|
| 1 | VOL1 | AP1 | ~5510 |
| 2 | VOL2 | AP2, AP3 | ~5520 |
| 3 | VOL3 | AP3 | ~5530 |
| 4 | VOL4 | unused | ~5540 |

FIG.7B
Remote site volume configuration table 1144B

| # | Remote site volume | Application which is using a volume | |
|---|---|---|---|
| 1 | VOL1 | unused | ~6010 |
| 2 | VOL2 | unused | ~6020 |
| 3 | VOL3 | unused | ~6030 |
| 4 | VOL4 | unused | ~6040 |

FIG.8
Copy pair configuration definition table 1146

| # | Primary site copy source volume | Remote site copy destination volume | |
|---|---|---|---|
| 1 | VOL1 | VOL10 | ~6802 |
| 2 | VOL2 | VOL11, VOL12 | ~6804 |
| 3 | VOL3, VOL4 | VOL13 | ~6806 |
| 4 | VOL5, VOL6 | VOL14, VOL15 | ~6808 |

Processing of copy pair configuration definition creation

FIG.11

Application configuration table 1142A

| Application | Site | Host | Volume used by the application | |
|---|---|---|---|---|
| AP1 | Site A | Host A | VOL1 | ~5211 |
| AP2 | Site A | Host A | VOL2 | ~5221 |
| AP2 | Site A | Host B | VOL2 | ~5231 |

Columns: 5300, 5350, 5400, 5450

FIG.12

Cluster configuration table 8300

| # | Application | Active | Stand-by | |
|---|---|---|---|---|
| 1 | AP2 | Host A | Host B | ~8310 |
| 2 | AP3 | Host C | Host D | ~8320 |

Columns: 8350, 8400, 8500

FIG.13

Composite application configuration table 8600

| # | Composite application | Configuration application | |
|---|---|---|---|
| 1 | ERP1 | AP1、AP3、AP5 | ~8610 |
| 2 | ERP2 | AP2、AP4 | ~8620 |

Columns: 8700, 8800

FIG.18

9950 VM configuration table

| VM | Volume used by the VM | |
|---|---|---|
| VM1 | VOL1 | ~9976 |
| VM2 | VOL2 | ~9977 |
| VM3 | VOL2, VOL3 | ~9978 |

VM configuration table 9920

| VM | Site | Host | Volume used by the VM | |
|---|---|---|---|---|
| VM1 | Site A | Host A | VOL1 | ~9991 |
| VM2 | Site A | Host A | VOL2 | ~9992 |
| VM3 | Site A | Host A | VOL2, VOL3 | ~9993 |

Primary site volume configuration table 9924A

| # | Primary site volume | VM which is using a volume | |
|---|---|---|---|
| 1 | VOL1 | VM1 | ~10210 |
| 2 | VOL2 | VM2、VM3 | ~10220 |
| 3 | VOL3 | VM3 | ~10230 |
| 4 | VOL4 | unused | ~10240 |

Remote site volume configuration table 9924B

| # | Remote site volume | VM which is using a volume | |
|---|---|---|---|
| 1 | VOL1 | unused | ~10510 |
| 2 | VOL2 | unused | ~10520 |
| 3 | VOL3 | unused | ~10530 |
| 4 | VOL4 | unused | ~10540 |

(6100) (10700)

Processing of copy pair configuration definition creation

METHOD OF CONSTRUCTING REPLICATION ENVIRONMENT AND STORAGE SYSTEM

CROSS REFERENCE TO RELATED APPLICATIONS

This application is a continuation of U.S. patent application Ser. No. 12/272,305, filed on Nov. 17, 2008, which application claims the benefit of Japanese Patent Application No. 2008-244216 filed on Sep. 24, 2008, the disclosures of which are incorporated herein by reference.

BACKGROUND OF THE INVENTION

1. Field of the Invention

The present invention relates to a method of constructing a replication environment in which a copy pair of a volume used by a group constituted by a plurality of applications is created in a storage system including a host computer, a storage apparatus, and a management computer; and to the storage system.

2. Description of the Related Art

Along with a wide spread of information systems, an amount of data handled by computing systems has been increased explosively. Importance of the handled data has also grown drastically. A high-level reliability in protecting such data has been required. Thus, a system of disaster recovery (DR) which can protect data from a logic failure (system failure) and a physical disaster has increasingly become important.

In the DR system, data can be duplicated by storing data outputted from a host computer which performs a task, not only in a volume in a storage apparatus directly connected to the host computer but also in a volume of another storage apparatus.

Typically, so-called local copy and remote copy are used in an information system which requires a high-level reliability. The local copy refers to a copying in which a data in a volume in a storage apparatus is copied in another volume of the same storage apparatus. The remote copy refers to a copying in which a data in a volume in a storage apparatus is copied in a volume in another storage apparatus. The local copy and the remote copy are collectively referred to as a replication. With a technique of the replication, if a volume has any trouble and cannot perform its operations, another volume can take over them using a duplicated data stored therein. Two volumes as a copy source and a copy destination in a replication relationship are collectively called a copy pair.

A replication is typically performed by selecting a volume used by an application desired to be copied, as a copy source, and selecting a volume having a free space sufficient to newly create a copy from the copy source, as a copy destination. This operation creates a configuration definition of a copy pair. A remote copy is performed by, as a preliminary operation, executing an initial copy based on information on the copy pair configuration definition prepared as described above. The initial copy means a copying of all data in the copy source volume into the copy destination volume. After executing the initial copy, an update copy is performed to the copy destination volume each time the host computer provides write data to the copy source volume. If a storage system as a copy source has any trouble, a task in the copy source volume can be restored using the copy destination volume in a storage system as a copy destination.

Japanese Laid-Open Patent Application, Publication No. 2005-11311 discloses a technique of creating a copy pair configuration definition by specifying an application as a copy source, in a storage system including a plurality of host computers and a plurality of storage apparatuses.

In Japanese Laid-Open Patent Application, Publication No. 2005-11311, a resource at a copy destination (a secondary computer resource) is selected based on at least a set of user-specified policy. The policy used herein includes characteristics (for example, reliability) of a secondary computer resource and a cost thereof. Nevertheless, such a selection does not give sufficient consideration to a task executed in the host computer.

A problem in constructing a DR system is an environment construction of a replication by a task as a unit. This is because, if a task is constituted by a group configured by a plurality of applications, protection of one or more specific applications alone is not sufficient to carry on the task. Such a task may be constituted by a plurality of associated applications, or a specific application in the task may have a cluster configuration.

The present invention has been made in an attempt to solve the aforementioned problems. The present invention provides a method of constructing a replication environment in which a copy pair of a volume used by a group constituted by a plurality of applications in a storage system is created, and the storage system.

SUMMARY OF THE INVENTION

A management computer consolidates management of a usage condition of a volume collected from a host computer and a storage apparatus at each site and prevents a volume from duplicating among applications as a copy source, by an application as a unit. This makes it possible to select a used volume of an application as a copy source without excess or deficiency and to create a copy pair configuration definition without duplication or incompatibility.

Other features and advantages of the present invention will become more apparent from the following detailed description of the invention, when taken in conjunction with the accompanying exemplary drawings.

BRIEF DESCRIPTION OF THE DRAWINGS

FIG. 5 is a diagram showing an example of an application configuration table stored in the host computer according to the first embodiment.

FIG. 6 is a diagram showing an example of an application configuration table stored in the management computer according to the first embodiment.

FIG. 7A is a diagram showing an example of a volume configuration table at a primary site in the management computer according to the first embodiment. FIG. 7B is a diagram showing an example of a volume configuration table at a remote site in the management computer according to the first embodiment.

FIG. 8 is a diagram showing an example of a copy pair configuration definition table stored in the management computer and the storage apparatus according to the first embodiment.

FIG. 11 is a diagram showing an example of an application configuration table stored in a management computer according to a second embodiment.

FIG. 12 is a diagram showing an example of a cluster configuration table according to the second embodiment.

FIG. 13 is a diagram showing an example of a composite application configuration table according to a third embodiment.

FIG. 18 is a diagram showing an example of a VM (virtual machine) configuration table stored in the host computer according to the fourth embodiment.

FIG. 19 is a diagram showing an example of a VM configuration table stored in the management computer according to the fourth embodiment.

FIG. 20A is a diagram showing an example of a volume configuration table at a primary site stored in the management computer according to the fourth embodiment.

FIG. 20B is a diagram showing an example of a volume configuration table at a remote site stored in the management computer according to the fourth embodiment.

DETAILED DESCRIPTION OF THE EXEMPLARY EMBODIMENT

Next is described an embodiment of the present invention. The present invention is not, however, limited to the embodiment described below.

First Embodiment

Figure 1:
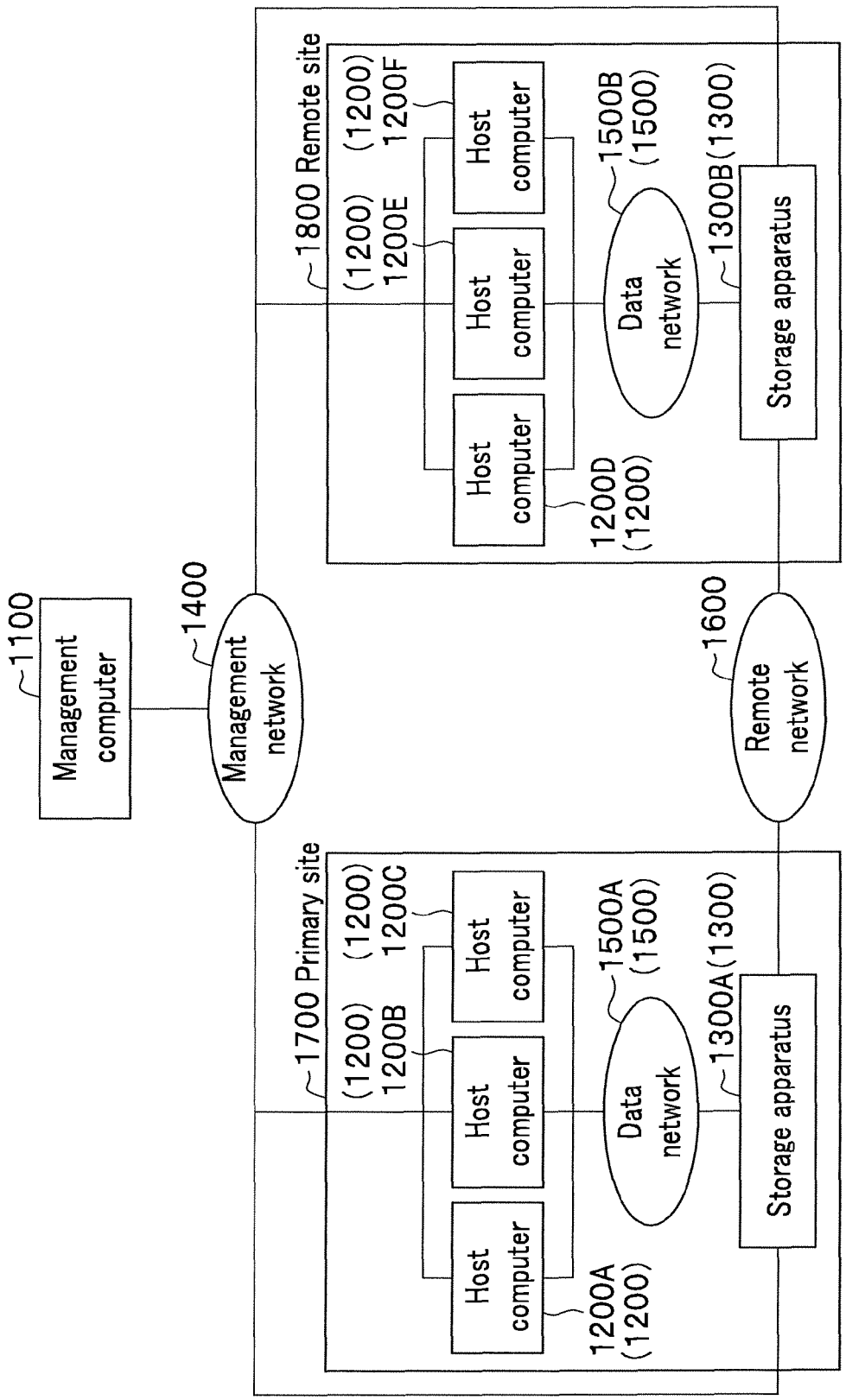
FIG. 1 is a diagram showing a general configuration of a storage system according to a first embodiment.

FIG. 1 shows a general configuration of a storage system according to the first embodiment. The storage system includes a storage apparatus 1300A (which may be collectively referred to as a storage apparatus 1300; ditto below), and host computers 1200A(1200),1200B(1200),1200C(1200), which are connected via a data network 1500A(1500) (which may also be referred to as a first network). The storage system also includes a storage apparatus 1300B(1300) and host computers 1200D(1200), 1200E(1200),1200F(1200), which are connected via a data network 1500B(1500). The management computer 1100, host computers 1200, and storage apparatus 1300 are connected via a management network 1400 (which may also be referred to as a second network). The storage apparatuses 1300A and 1300B are connected via a remote network 1600.

The data network 1500 herein is a storage area network (SAN) but may be an IP network or any other data communication network. The management network 1400 herein is an IP network, but may be a SAN or any other data communication network.

The management computer 1100 herein is directly connected to the storage apparatus 1300 but may acquire necessary information via the host computer 1200. The data network 1500 and the management network 1400 herein are separately provided but the data network 1500 may also serve as the management network 1400. Or, the management computer 1100 and the host computer 1200 may be one single computer unit. For convenience of description, the storage system shown in FIG. 1 includes two storage apparatuses 1300, six host computers 1200, and one management computer 1100. In the present invention, however, the number of those units is not limited to this.

In this embodiment, a set of the host computer 1200, the storage apparatus 1300, and the data network 1500 for connecting the two formers is herein referred to as a site. A plurality of sites is typically provided at geographically separated locations. This is because, if a site at a certain location is damaged and cannot continue its operations, another site at a separated location which is not damaged can take over them. In FIG. 1, the storage system includes a primary site 1700 and a remote site 1800 which is a backup site of the primary site 1700. This configuration is referred to as a two data center (2DC) configuration.

In the 2DC configuration, a remote copy is performed between the primary site 1700 and the remote site 1800 via the remote network 1600. The remote copy herein means a technique of duplicating a data by copying a data from a volume in a storage apparatus into a volume in another storage apparatus. Using the remote copy technique, if a volume has any trouble and cannot perform its operations, another volume can take over them using a duplicated data stored therein. Two volumes as a copy source and a copy destination in a remote copy relationship are collectively called a copy pair. For convenience of description, the storage system of the present invention includes two sites. However, the number of those units is not limited to this.

Figure 2:
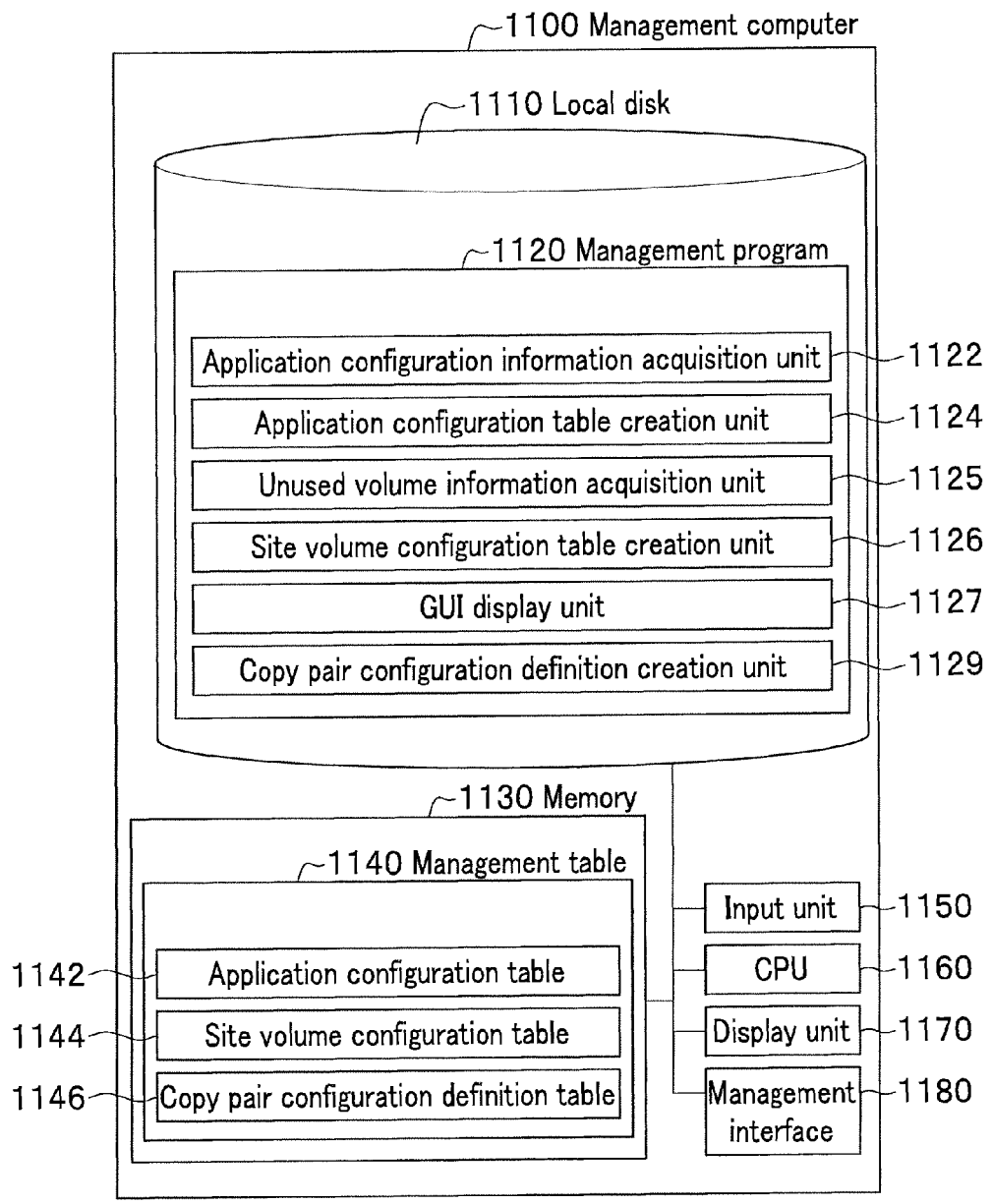
FIG. 2 is a diagram showing a configuration of a management computer according to the first embodiment.
Figure 3:
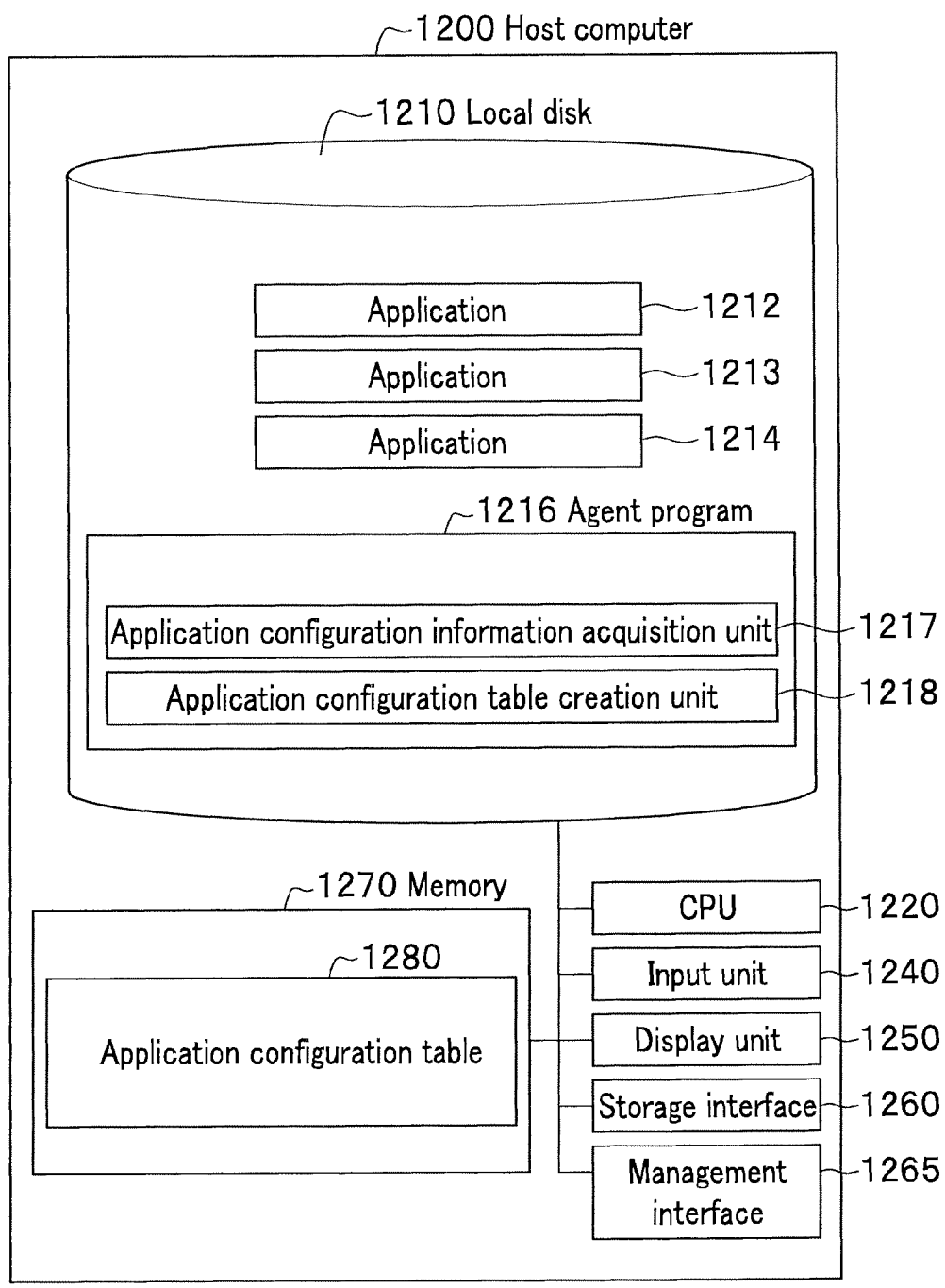
FIG. 3 is a diagram showing a configuration of a host computer according to the first embodiment.
Figure 4:
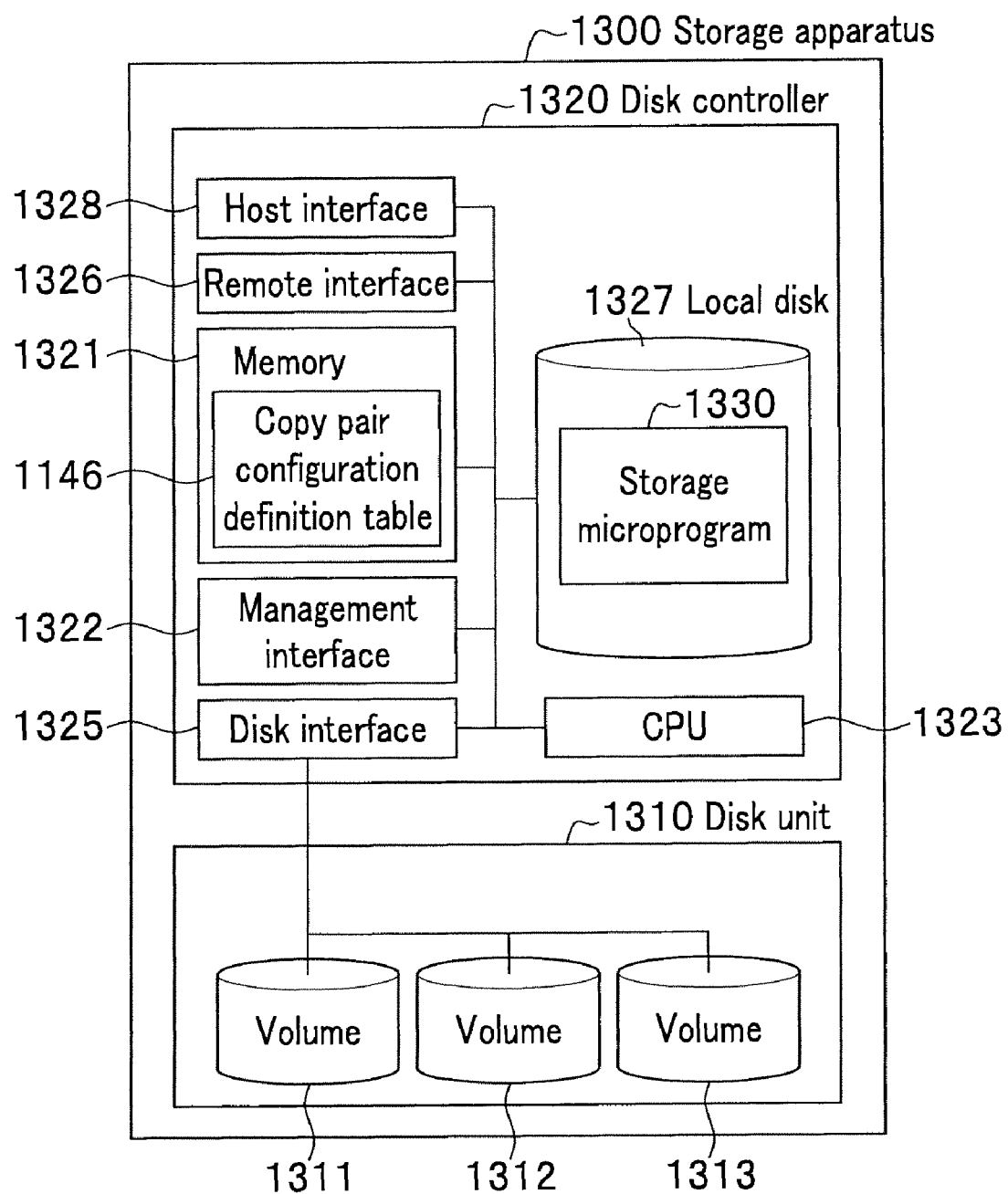
FIG. 4 is a diagram showing a configuration of a storage apparatus according to the first embodiment.

FIG. 2, FIG. 3, and FIG. 4 show configurations of the management computer 1100, host computer 1200, and storage apparatus 1300, respectively.

In FIG. 2, the management computer 1100 includes an input unit 1150 such as a keyboard and a mouse, a CPU (central processing unit) 1160, a display unit 1170 such as a LCD (liquid crystal display), a memory 1130, a local disk 1110, and a management interface 1180 for sending and receiving a data or a control instruction for a system management to and from the host computer 1200. The local disk 1110 is a disk unit such as a hard disk drive connected to the management computer 1100 and stores a management program 1120 therein. The management interface 1180 is an interface to the management network 1400.

The management program 1120 is loaded into the memory 1130 in the management computer 1100 and is executed by the CPU 1160. The management program 1120 is a program in which a function of performing a configuration definition of a copy pair is provided via the input unit 1150 such as a keyboard or a mouse or the display unit 1170 such as a graphical user interface (GUI).

The management program 1120 includes: an application configuration information acquisition unit 1122 for acquiring information on a used volume in an application in a host computer at each site; an application configuration table creation unit 1124 for creating a table in which information acquired by the application configuration information acquisition unit 1122 is arranged; an unused volume information acquisition unit 1125 for acquiring information on an unused volume from a storage microprogram in the storage apparatus 1300; a site volume configuration table creation unit 1126 for creating a table in which the table created by the application configuration table creation unit 1124 and the information acquired by the unused volume information acquisition unit 1125 are arranged; a GUI display unit 1127 for providing an interface of creating a configuration definition of a copy pair to a user; and a copy pair configuration definition creation unit 1129 for conducting a processing of copy pair configuration definition creation.

The management table 1140 in the memory 1130 includes; an application configuration table 1142 (which may also be referred to as application configuration information, see FIG. 6) created by the application configuration table creation unit 1124; a site volume configuration table 1144 (which may also be referred to as site volume configuration information, see FIG. 7A and FIG. 7B) created by the site volume configuration table creation unit 1126; and a copy pair configuration definition table 1146 (see FIG. 8) representing configuration definition information of a copy pair. Details of each of the tables will be described later.

FIG. 3 shows a configuration of a host computer according to the first embodiment. In FIG. 3, the host computer 1200 includes an input unit 1240 such as a keyboard and a mouse, a CPU 1220, a display unit 1250 such as a LCD, a memory 1270, a storage interface 1260, a management interface 1265, and a local disk 1210.

The management interface 1265 is an interface to the management network 1400 and sends and receives a data or a control instruction to and from the management computer 1100. The storage interface 1260 is an interface to the data network 1500 and sends and receives a data or a control instruction to and from the storage apparatus 1300. The local disk 1210 is a disk unit connected to the host computer 1200, such as a hard disk drive and stores therein a plurality of applications 1212, 1213, 1214 and an agent program 1216.

The plurality of applications 1212, 1213 and 1214 are loaded into the memory 1270 in the host computer 1200 and are executed by the CPU 1220. Each of the applications 1212, 1213, and 1214 is a program for executing a task by reading or writing data to a volume in the storage apparatus 1300. Each of the applications 1212, 1213 and 1214 may be a DBMS (data base management system) or a file system. For convenience of description, FIG. 3 shows three applications. In the present invention, however, the number of the applications is not limited to this.

The agent program 1216 is loaded into the memory 1270 of the host computer 1200 and is executed by the CPU 1220. The agent program 1216 is a program for acquiring information from an application based on instructions from the management computer 1100. The agent program 1216 includes: an application configuration information acquisition unit 1217 for acquiring information on a used volume in an application of its own host computer 1200; and an application configuration table creation unit 1218 for creating a table in which information acquired by the application configuration information acquisition unit 1217 is arranged. An application configuration table 1280 (see FIG. 5) in the memory 1270 will be described later.

FIG. 4 shows a configuration of a storage apparatus according to the first embodiment. In FIG. 4, the storage apparatus 1300 includes; a disk unit 1310 for storing data therein; a disk controller 1320 for controlling the storage apparatus 1300.

The disk unit 1310 includes a plurality of volumes 1311, 1312 and 1313. A volume used herein may be a physical volume such as a hard disk drive (HDD) or a logical volume such as a logical device. A type of the volume is not limited in the present invention. For convenience of description, FIG. 4 shows three volumes. In the present invention, however, the number of the volumes is not limited to this. A volume can make a copy pair.

The disk controller 1320 includes a host interface 1328, a remote interface 1326, a disk interface 1325, a memory 1321, a CPU 1323, a management interface 1322, and a local disk 1327.

The management interface 1322 is an interface to the management network 1400 and sends and receives a data or a control instruction to and from the management computer 1100. The local disk 1327 is a disk unit connected to the disk controller 1320, such as a hard disk and stores therein a storage microprogram 1330.

The storage microprogram 1330 is loaded into the memory 1321 in the disk controller 1320 and is executed by the CPU 1323. In this embodiment, the storage microprogram 1330 is stored in the local disk 1327 in the disk controller 1320. In the present invention, however, a configuration is not limited to this. For example, the programs and tables may be stored in a flash memory provided in the disk controller 1320 or in any disk in the disk unit 1310.

The storage microprogram 1330 receives instructions from the unused volume information acquisition unit 1125 and the copy pair configuration definition creation unit 1129 in the management computer 1100. Based on the instructions, the storage microprogram 1330 acquires a name of a site to which itself belongs and a usage condition of a volume in its own storage apparatus and provides controls on a copy pair. The usage condition of a volume includes information on whether or not the volume is used by an application or an OS (Operating System). An example of the controls of a copy pair is creation of a copy pair. The copy pair configuration definition table 1146 (see FIG. 8) in the memory 1321 is a table representing information on the configuration definition of a copy pair created by the management computer 1100. The storage apparatus 1300 executes a copy task using the information in the copy pair configuration definition table 1324.

The host interface 1328 is an interface to the data network 1500 and sends and receives a data or control instruction to and from the host computer 1200. The remote interface 1326 is an interface to the remote network 1600 and transfers data in an operation of a site-to-site remote copy. The disk interface 1325 is an interface to the disk unit 1310 and sends and receives a data or control instruction thereto and therefrom.

FIG. 5 shows an example of an application configuration table 1280 stored in the host computer 1200 according to the first embodiment. In FIG. 5, the application configuration table 1280 stored in the host computer 1200 includes an identifier of an application 5100 and an identifier of a volume 5150 used by the application. The application 5100 stores therein an identifier of an application which is installed on the host computer 1200 and uses a volume in the storage apparatus 1300. The volume 5150 used by the application stores therein an identifier of a volume used by the application shown at the application 5100. In this embodiment, the application configuration information acquisition unit 1217 (see FIG. 3) can acquire information on an application from its own host computer 1200.

Reference numerals 5010 to 5030 each indicate information on a volume used by the application installed on the host computer 1200 at the primary site 1700 in the storage system shown in FIG. 1. More specifically, the reference numeral 5010 indicates that an application referred to as AP1 uses only a volume referred to as VOL1. The reference numeral 5020 indicates that an application referred to as AP2 uses only a volume referred to as VOL2. The reference numeral 5030 indicates that an application referred to as AP3 uses two volumes referred to as VOL2 and VOL3. In other words, the applications AP2 and AP3 share the volume VOL2.

FIG. 6 shows an example of an application configuration table stored in the management computer 1100 according to the first embodiment. In FIG. 6, the application configuration table 1142 in the management computer 1100 includes respective identifiers of an application 5300, a site 5350, a host 5400, and a volume 5450 used by the application. The application 5300 stores therein an identifier of an application. The site 5350 stores therein an identifier of a site to which the application shown in the application 5300 belongs. The application 5400 stores therein an identifier of a host in which the application shown at the application 5300 is in operation. The volume 5450 used by the application stores therein an identifier of a used volume of the application shown at the application 5300.

The application configuration information acquisition unit 1122 (see FIG. 2) acquires information included in the application configuration table 1142 from the host computer 1200 shown in FIG. 1. In this embodiment, the storage system has two sites, namely, the primary site 1700 and the remote site 1800. The application configuration information acquisition unit 1122 collects the application configuration table 1280 (see FIG. 3) from the host computer 1200 at the each site and creates the application configuration table 1142 from the application configuration table 1280.

Reference numerals 5210 to 5230 each indicate information on an application present in the host computer 1200 at the primary site 1700 and the remote site 1800 in the storage system shown in FIG. 1.

More specifically, the reference numeral 5210 indicates that the application referred to as AP1 belongs to a site referred to as Site A, operates in the host computer 1200 referred to as Host A, and uses only a volume referred to as VOL1. The reference numeral 5220 indicates that the application referred to as AP2 belongs to a site referred to as Site A, operates in the host computer 1200 referred to as Host A, and uses only the volume referred to as VOL2. The reference numeral 5230 indicates that the application referred to as AP3 belongs to a site referred to as Site A, operates in the host computer 1200 referred to as Host A, and uses the two volumes referred to as VOL2 and VOL3. In other words, the applications AP2 and AP3 share the volume VOL2.

FIG. 7A shows an example of a volume configuration table 1144A at the primary site 1700 (see FIG. 1) in the management computer 1100 according to the first embodiment. FIG. 7B shows an example of a volume configuration table 1144B at the remote site 1800 (see FIG. 1) in the management computer 1100 according to the first embodiment. The site volume configuration table 1144 (see FIG. 2) in the management computer 1100 includes the primary site volume configuration table 1144A and the remote site volume configuration table 1144B.

In FIG. 7A, the primary site volume configuration table 1144A includes respective identifiers at a primary site volume 5600 and of an application 5700 which is using a volume. The primary site volume 5600 stores therein an identifier of a volume present at the primary site 1700. The application 5700 which is using a volume stores therein an identifier of an application using the volume shown at the primary site volume 5600. The site volume configuration table creation unit 1126 (see FIG. 2) acquires information on the volume used by an application from the application configuration table 1142 and also acquires information on a volume not used by an application from the unused volume information acquisition unit 1125. The management computer 1100 can acquire information on all volumes at the primary site 1700.

Reference numerals 5510 to 5540 each indicate information on a volume present in the storage apparatus 1300 at the primary site 1700 in the storage system shown in FIG. 1.

More specifically, the reference numeral 5510 indicates that the volume referred to as VOL1 is used by an application referred to as AP1. The reference numeral 5520 indicates that the volume referred to as VOL2 is used by applications referred to as AP2 and AP3. In other words, the applications AP2 and AP3 share the volume VOL2. The reference numeral 5530 indicates that a volume referred to as VOL3 is used by an application referred to as AP3. The reference numeral 5540 indicates that a volume referred to as VOL4 is not used by any application.

In FIG. 7B, the remote site volume configuration table 1144B includes respective identifiers of a remote site volume 6100 and of an application 6200 which is using a volume. The remote site volume 6100 stores therein an identifier of a volume present at the remote site 1800. The application 6200 which is using a volume stores therein an identifier of an application using the volume shown at the remote site volume 6100.

Similarly to the primary site volume configuration table 1144A of FIG. 7A, the site volume configuration table creation unit 1126 (see FIG. 2) acquires information on a volume used by an application from the application configuration table 1142 and also acquires information on a volume not used by an application from the unused volume information acquisition unit 1125. In this embodiment, the remote site 1800 is assumed to be a site prepared as a copy destination, and thus, any volume in the remote site 1800 is not used. In the present invention, however, even if an application is running at a site and if the site still has a necessary and sufficient unused volume, the site may be set as a remote site. Therefore, whether or not an application is running at a site does not make any difference.

Reference numerals 6010 to 6040 each indicate information on a volume present in the storage apparatus 1300 at the remote site 1800 in the storage system shown in FIG. 1. The reference numerals 6010, 6020, 6030 and 6040 indicate that the volumes referred to as VOL1, VOL2, VOL3 and VOL4 are unused, respectively.

FIG. 8 shows an example of a copy pair configuration definition table 1146 stored in the management computer 1100 and the storage apparatus 1300 according to the first embodiment. The copy pair configuration definition table 1146 of FIG. 8 is both in the management computer 1100 and the storage apparatus 1300. In the storage system in FIG. 1, respective storage apparatuses 1300 at the primary site 1700 and the remote site 1800 have respective copy pair configuration definition tables 1146.

The copy pair configuration definition table 1146 includes respective identifiers of a primary site copy source volume 6850 and of a remote site copy destination volume 6900. The primary site copy source volume 6850 stores therein an identifier of a copy source volume. The remote site copy destination volume 6900 stores therein an identifier of a volume to make a copy pair with the volume shown at the primary site copy source volume 6850. The copy pair configuration definition creation unit 1129 (see FIG. 2) determines a copy source volume and a copy destination volume according to an operation performed by a user and creates the copy pair configuration definition table 1146. The present invention can be carried out in another configuration in which only the management computer 1100 includes the copy pair configuration definition table 1146; the management computer 1100 sends information only on a copy source volume to the primary site 1700 and sends information only on a copy destination volume to the remote site 1800; and communication between the primary site 1700 and the remote site 1800 allows an operation of creating a copy pair to be conducted.

Reference numerals 6802 to 6808 each indicate configuration definition information on a copy pair in the storage system shown in FIG. 1. The reference numeral 6802 indicates that a volume referred to as VOL1 and a volume referred to as VOL10 make a copy pair. The reference numeral 6804 indicates that a volume referred to as VOL2 and volumes referred to as VOL11 and VOL12 make a copy pair. The reference numeral 6806 indicates that volumes referred to as VOL3 and VOL4 and a volume referred to as VOL13 make a copy pair. The reference numeral 6808 indicates that volumes referred to as VOL5 and VOL6 and volumes referred to as VOL14 and VOL15 make a copy pair.

Figure 9:
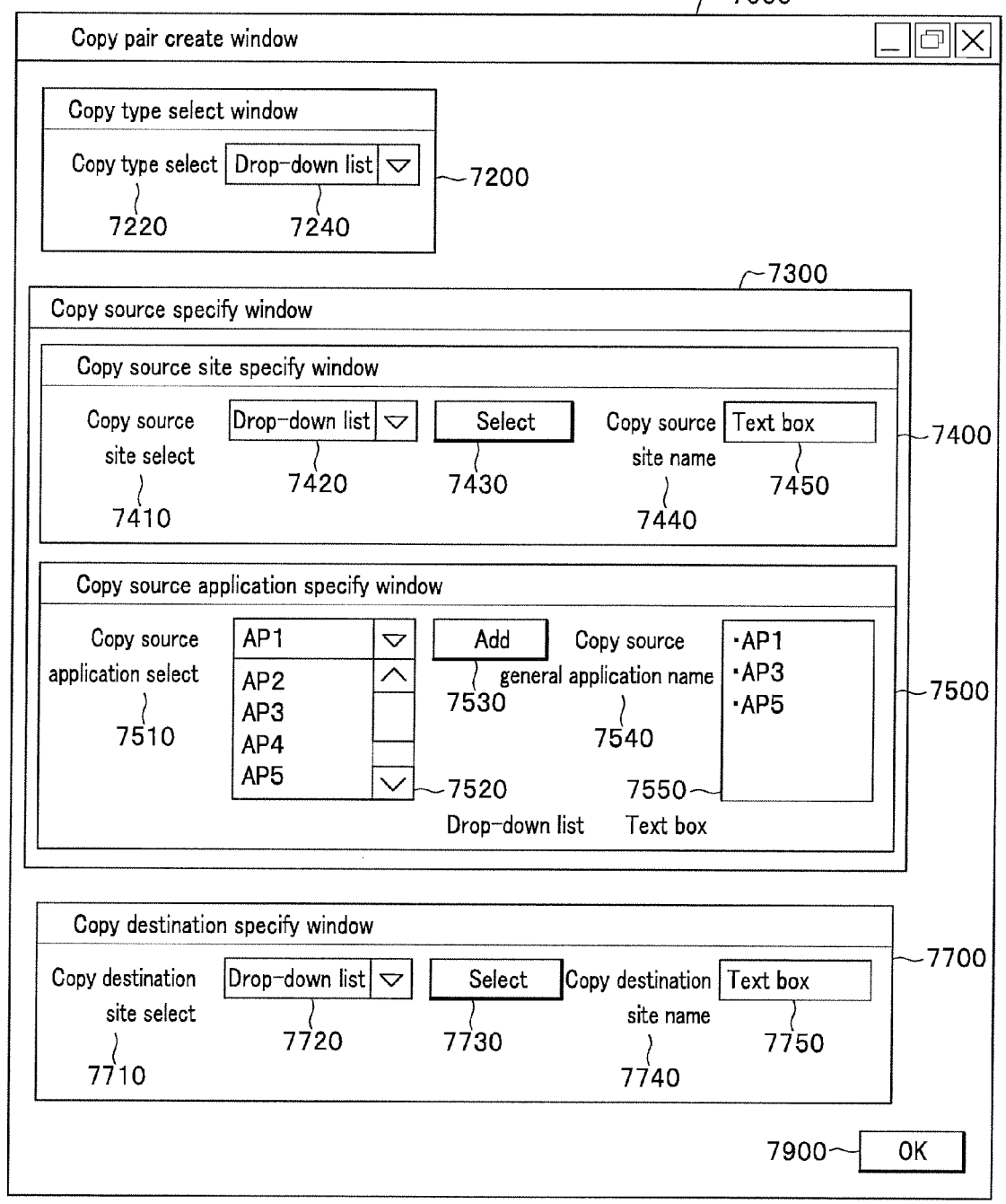
FIG. 9 is a diagram showing an example of a graphical user interface (GUI) according to the first embodiment.

FIG. 9 shows an example of a GUI according to the first embodiment. The copy pair create window 7000 is an example of a display to realize this embodiment. The copy pair create window 7000 includes a copy type select window 7200, a copy source specify window 7300, a copy destination specify window 7700, and an OK button 7900.

The copy type select window 7200 is a window for selecting a copy type. A drop-down list 7240 displays available copy types. In this embodiment, the available copy types include, as an example, a synchronous copy and an asynchronous copy. Upon a user's selection of the copy type from the drop-down list 7240, the copy type of a copy pair to be made is determined.

The copy source specify window 7300 is a window for selecting an application as a copy source. The copy source specify window 7300 includes a copy source site specify window 7400 and a copy source application specify window 7500.

The copy source site specify window 7400 in the copy source specify window 7300 is a window for selecting a site as a copy source. A drop-down list 7420 displays sites at the site 5350 in the application configuration table 1142 shown in FIG. 6, as a candidate copy source. A select button 7430 is a button for determining a site selected from the drop-down list 7420 as a copy source site. A text box 7450 displays a name of the site selected from the drop-down list 7420 with the select button 7430.

A copy source application specify window 7500 in the copy source specify window 7300 is a window for specifying an application as a copy source. A drop-down list 7520 displays an application at the site displayed in the text box 7450. Such an application is acquired from the application 5700 which is using a volume in the primary site volume configuration table 1144A shown in FIG. 7A. An add button 7530 is a button for adding an application selected from the drop-down list 7520 as a copy source application. A text box 7550 displays a name of the application selected from the drop-down list 7520 with the add button 7530.

The copy destination specify window 7700 is a window for specifying a site as a copy destination. A drop-down list 7720 displays a name of a site as shown in the configuration of FIG. 1. The name of a site is acquired from the management program 1120 (see FIG. 2) in the management computer 1100. A select button 7730 is a button for determining the site selected from the drop-down list 7720 as a copy destination site. A text box 7750 displays the site name selected from the drop-down list 7720 with the select button 7730.

The OK button 7900 is a button for determining creation of a copy pair configuration definition with the application shown in the text box 7550 as a copy source and the site shown in the text box 7750 as a copy destination.

Below are described step-by-step operations for creating a copy pair configuration definition which are performed by a user using the GUI as shown in FIG. 9. First, the user specifies a site as a copy source and selects one or more applications constituting the task as a copy source. More specifically, the user selects the site as a copy source from the drop-down list 7420 and clicks the select button 7430, to thereby determine the copy source site. The determined copy source site is displayed in the text box 7450.

Next, an application as a copy source is determined. The user selects an application as a copy source from the drop-down list 7520 in which an application at a site displayed in the text box 7450 is displayed and clicks the add button 7530, to thereby select the copy source application. The determined copy source application is displayed in the text box 7550. If the user wants to add another copy source application, the user once again selects a desired application from the drop-down list 7520 and clicks the add button 7530, to thereby add another copy source application.

Next, a site as a copy destination is specified. The user selects a site as a copy destination from the drop-down list 7720 and clicks the select button 7730, to thereby determine the copy destination site. The determined copy destination site is displayed in the text box 7750.

Finally, the user clicks the OK button 7900. This operation creates a copy pair configuration definition in which the application shown in the text box 7550 is the copy source application, and the site shown in the text box 7750 is the copy destination site.

Figure 10:
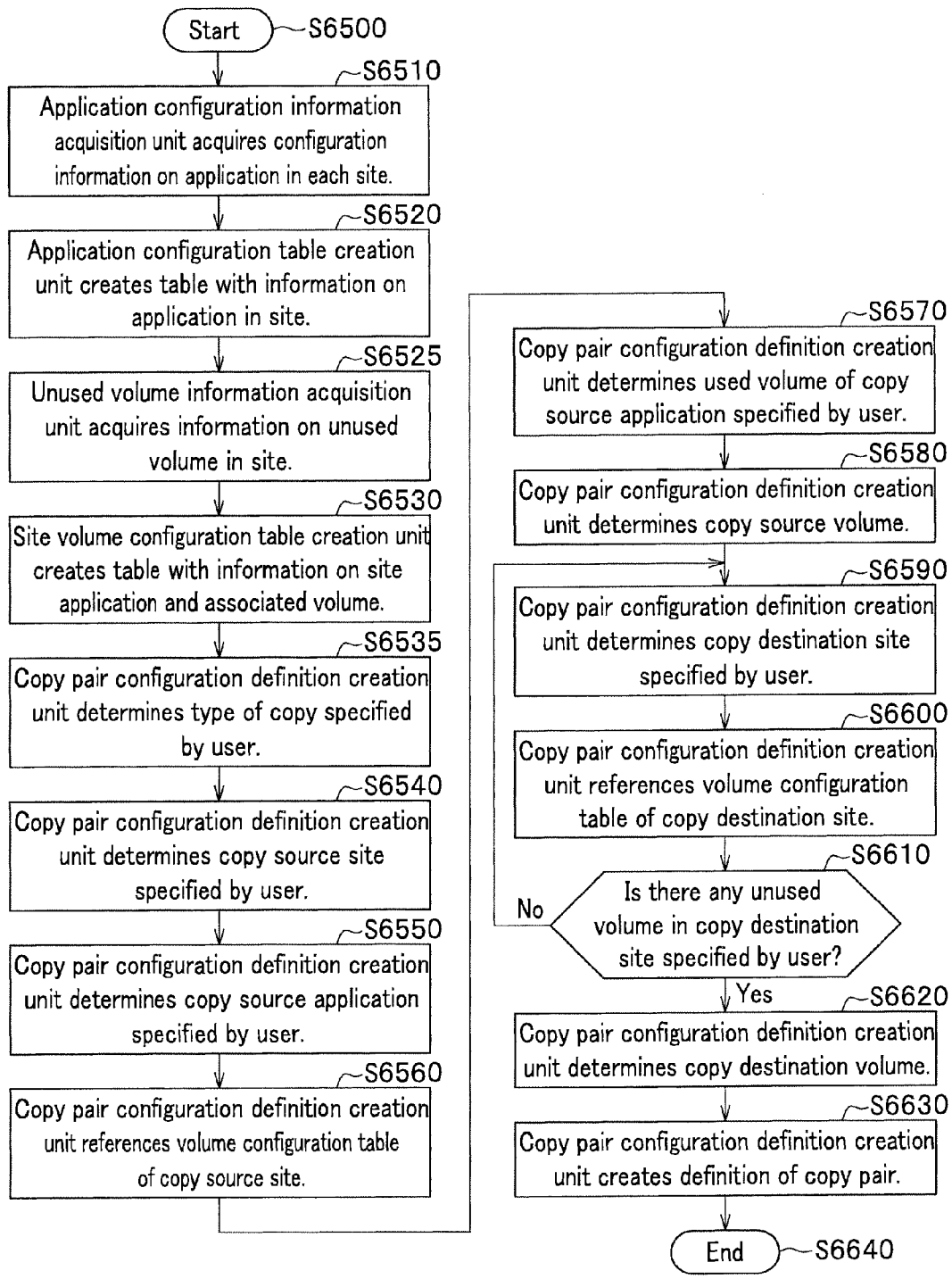
FIG. 10 is a flowchart showing a processing of copy pair configuration definition creation according to the first embodiment.

FIG. 10 shows a flowchart of copy pair configuration definition creation according to the first embodiment. The processing of copy pair configuration definition creation in the management program 1120 in the management computer 1100 is performed by the application configuration information acquisition unit 1122, application configuration table creation unit 1124, unused volume information acquisition unit 1125, site volume configuration table creation unit 1126, GUI display unit 1127, and copy pair configuration definition creation unit 1129.

The processing starts at step S6500. In step S6510, the application configuration information acquisition unit 1122 acquires configuration information on an application at each site. More specifically, the application configuration information acquisition unit 1122 requests the application configuration information acquisition unit 1217 in the host computer 1200 to acquire the application configuration table 1280 in which information on an application in the host computer 1200 is managed.

In step S6520, the application configuration table creation unit 1124 creates the application configuration table 1142 in which the received application configuration table 1280 is arranged with information on a site to which an application of interest belongs and information on a host in which the application is in operation.

In step S6525, the unused volume information acquisition unit 1125 requests the storage microprogram 1330 in the storage apparatus 1300 to acquire a name of a site connected to the management computer 1100 and a usage condition of a volume at the site. That is, the unused volume information acquisition unit 1125 acquires information on an unused volume at the site.

In step S6530, the site volume configuration table creation unit 1126 creates the site volume configuration table 1144 using the application configuration table 1142 created in step S6520 and the usage condition in the storage system received in step S6525.

In step S6535, the copy pair configuration definition creation unit 1129 determines the copy type specified by the user and acquired via the GUI display unit 1127. In step S6540, the GUI display unit 1127 displays a list of the sites included in the configuration shown in FIG. 1 to the user. The copy pair configuration definition creation unit 1129 determines a site specified by the user as a copy source site.

In step S6550, the GUI display unit 1127 displays, to the user, an application at the site determined by the copy pair configuration definition creation unit 1129 in step S6540. The copy pair configuration definition creation unit 1129 determines an application specified by the user from among applications at the site as a copy source application. Generally, the replication as described above is performed by a task as a unit, and the task is typically configured by a plurality of applications. Thus, a plurality of applications can be specified as a copy source herein.

In step S6560, the copy pair configuration definition creation unit 1129 references the site volume configuration table 1144 created in step S6530. In step S6570, the copy pair configuration definition creation unit 1129 selects a volume used by the application determined in step S6550 without duplication. In step S6580, the copy pair configuration definition creation unit 1129 determines the volume selected in step S6570 as a copy source volume. More specifically, if a group constituted by a plurality of applications (for example, AP1,AP2,AP3) to be copied is specified from the copy pair create window 7000 displayed by the GUI display unit 1127, the copy pair configuration definition creation unit 1129 selects, without duplication, volumes (for example, VOL1, VOL2,VOL3) used by the specified group based on the volume configuration information and determines the volumes as copy source volumes. Note that VOL2 is used in both AP2 and AP3, however, is selected only once without duplication.

In step S6590, the GUI display unit 1127 displays the sites included in the configuration shown in FIG. 1 to the user. The copy pair configuration definition creation unit 1129 determines a site specified by the user from the displayed sites as a copy destination.

In step S6600, the copy pair configuration definition creation unit 1129 references the volume configuration table 1144 created in step S6530. In step S6610, the copy pair configuration definition creation unit 1129 determines whether or not there is a volume having a capacity equal to or more than a capacity of the copy source volume determined in step S6580, at the site determined in step S6590.

In step S6620, if there is a volume having a capacity equal to or more than a capacity of the copy source volume determined in step S6580, at the site determined in step S6590 (Yes in step S6610), the copy pair configuration definition creation unit 1129 determines the volume as a copy destination volume.

In step S6590, if there is not a volume having a capacity equal to or more than a capacity of the copy source volume determined in step S6580, at the site determined in step S6590 (No in step S6610), the GUI display unit 1127 again displays the sites included in the configuration of FIG. 1 to the user. The copy pair configuration definition creation unit 1129 determines a site specified by the user from among the displayed sites as a copy destination. If an unused volume is not determined at all copy destination sites, the GUI display unit 1127 may make the display unit 1170 display a message warning that a sufficient capacity of an unused volume in the copy destination is not found.

In step S6630, the copy pair configuration definition creation unit 1129 creates a copy pair configuration definition in which the volume determined in step S6580 is the copy source, and the volume determined in step S6620 is the copy destination. In step S6640, the processing of copy pair configuration definition creation terminates.

Second Embodiment

The first embodiment has described that a copy pair is created from among a plurality of applications constituting a task, by the task as a unit. A second embodiment describes that a copy pair is created among a plurality of applications in a cluster configuration.

The cluster configuration shown in the second embodiment realizes a high-level availability in which, if a host computer in which an application is performing a processing has a trouble, another application same as the former on standby in another host computer can take over the processing. In such a configuration, the same applications exist in different host computers. Such applications share a same volume. Note that, in some cases, the cluster configuration has a purpose of load balancing in which a same application operates in each of different host computers so as to distribute a processing across the different host computers. However, the purpose of the cluster configuration is not herein considered in particular.

The second embodiment assumes that, for example, if a plurality of applications have a cluster configuration in two different host computers, the applications in the cluster configuration use a same volume. If such applications are specified as a copy source, a volume as a copy source can be selected without duplication.

The second embodiment as a variation of the first embodiment describes that, even if applications as a copy source have a cluster configuration, a copy pair configuration definition can be created without duplication. A configuration of a storage system in the second embodiment is shown in FIG. 1 to FIG. 4, which is the same as the configuration in the first embodiment.

FIG. 11 shows an example of an application configuration table 1142A stored in the management computer 1100 according to the second embodiment. The application configuration table 1142A of FIG. 11 shows a case where an application having a cluster configuration is present in the storage system. Below is described the application configuration table 1142A, focusing on a difference from the application configuration table 1142 shown in FIG. 6 in the first embodiment. The application configuration table 1142A includes respective identifiers of the application 5300, site 5350, host 5400, and volume 5450 used by the application. A configuration of the application configuration table 1142A is same as that of application configuration table 1142 in the management computer 1100 in the first embodiment. However, in the second embodiment, the application 5300 of the application configuration table 1142A has the identifiers of the applications having a cluster configuration. The applications in the cluster configuration use a same volume.

Reference numerals 5211 to 5231 indicate information on applications present in the host computer 1200 at the primary site 1700 and the remote site 1800, if the storage system having the configuration shown in FIG. 1 has applications in a cluster configuration. The reference numeral 5211 indicates that an application AP1 belongs to a site referred to as Site A, runs in a host computer Host A, and uses only a volume VOL1. The reference numeral 5221 indicates that an application AP2 belongs to the site Site A, runs in the host computer Host A, and uses only a volume VOL2.

The reference numeral 5231 indicates that the application AP2 belongs to Site A, runs in Host A, and uses only VOL2. That is, AP2 has a cluster configuration in the two different host computers, Host A and Host B.

FIG. 12 shows an example of a cluster configuration table 8300 according to the second embodiment. The cluster configuration table 8300 is a table constituting the application configuration table 1280 in the host computer 1200. The cluster configuration table 8300 includes respective identifiers of an application 8350, Active 8400, and Stand-by 8500. The application 8350 stores therein an identifier of an application having the cluster configuration. The Active 8400 stores therein an identifier of a host computer in operation among the host computers in which the application shown at the application 8350 is present. The Stand-by 8500 stores therein an identifier of a host computer on standby among the host computers in which the application shown at the application 8350 is present. In this embodiment, it is assumed that the application configuration information acquisition unit 1217 in the agent program 1216 acquires information on a cluster configuration from an application in a host computer to which the application configuration information acquisition unit 1217 belongs.

Reference numerals 8310 to 8320 indicate information on the applications having a cluster configuration in the host computer 1200 in the storage system shown in FIG. 1. The reference numeral 8310 indicates that the application AP2 has a cluster configuration, the application shown at the Active 8400 is in the host computer referred to as Host A, and the application shown at the Stand-by 8500 is in the host computer Host B. The reference numeral 8320 indicates that an application AP3 has a cluster configuration, the application shown at the Active 8400 is in a host computer Host C, and the application shown at the Stand-by 8500 is in a host computer Host D.

Next is described a processing of a copy pair configuration definition according to the second embodiment, with reference to FIG. 10. Herein is described only a difference from the processing of a copy pair configuration definition according to the first embodiment. In step S6510, the application configuration information acquisition unit 1122 in the management computer 1100 requests the application configuration information acquisition unit 1217 in the host computer 1200 to acquire the application configuration table 1280 and the cluster configuration table 8300.

In step S6550, the copy pair configuration definition creation unit 1129 references the cluster configuration table 8300 acquired from the host computer 1200. The GUI display unit 1127 displays only an application at the Active 8400 among applications in a cluster configuration. Typically, a user knows which applications have a cluster configuration. Further, the applications in the cluster configuration use a same volume. Thus, the user has to do is only to specify an application currently in operation as a copy source.

In this embodiment, if the user specifies an application having the cluster configuration as a copy source, the user can determine a volume as the copy source without particularly identifying the cluster configuration of the applications. For convenience of description, the application at the Active 8400 is displayed herein. However, any one of the applications in the cluster configuration may be displayed. Therefore, the application displayed to the user may be any at the Active 8400 or the Stand-by 8500 in the present invention. In this embodiment, the cluster configuration table 8300 is separately provided from the application configuration table 1142A constituting the management table 1140. However, a table in which the cluster configuration table 8300 is combined with the application configuration table 1142A may be provided.

With the processing described above, even if a copy source application has a cluster configuration, the copy pair configuration definition can be created without duplication or incompatibility.

Third Embodiment

The present invention can be applied even if an application is constituted by a plurality of sub-applications. Herein, the application constituted by a plurality of sub-applications is referred to as a composite application. In other words, the composite application is a group constituted by a plurality of sub-applications. In a third embodiment, the composite application may include an application for integrating and managing a plurality of sub-applications such as an ERP (enterprise resource planning) package. In the present invention, if a composite application is specified as a copy source, a volume as the copy source can be selected without duplication. Below is described this embodiment focusing on a difference from the first embodiment. The configuration of a storage system in the third embodiment is shown in FIG. 1 to FIG. 4, which is the same as the configuration described in the first embodiment.

FIG. 13 shows an example of a composite application configuration table 8600 according to the third embodiment. The composite application configuration table 8600 is a table constituting the application configuration table 1280 in the host computer 1200 in this embodiment. The composite application configuration table 8600 shows a configuration of a composite application and includes respective identifiers of a composite application 8700 and of a configuration application 8800. The composite application 8700 stores therein an identifier of a composite application which is present in its own host computer 1200. The configuration application 8800 stores therein an identifier of an application constituting the application shown of the composite application 8700. In the present embodiment, the application configuration information acquisition unit 1217 is assumed to acquire information on a configuration of a composite application from an application in its own host computer 1200.

Reference numerals 8610 and 8620 indicate information on a composite application in the host computer 1200 in the storage system shown in FIG. 1. The reference numeral 8610 indicates that an application ERP1 is configured by sub-applications AP1, AP3 and AP5. That is, the application ERP1 uses volumes used by the sub-applications AP1, AP3 and AP5. The reference numeral 8620 indicates that an application ERP2 is configured by sub-applications AP2 and AP4. That is, the application ERP2 uses volumes used by the sub-applications AP2 and AP4.

Figure 14:
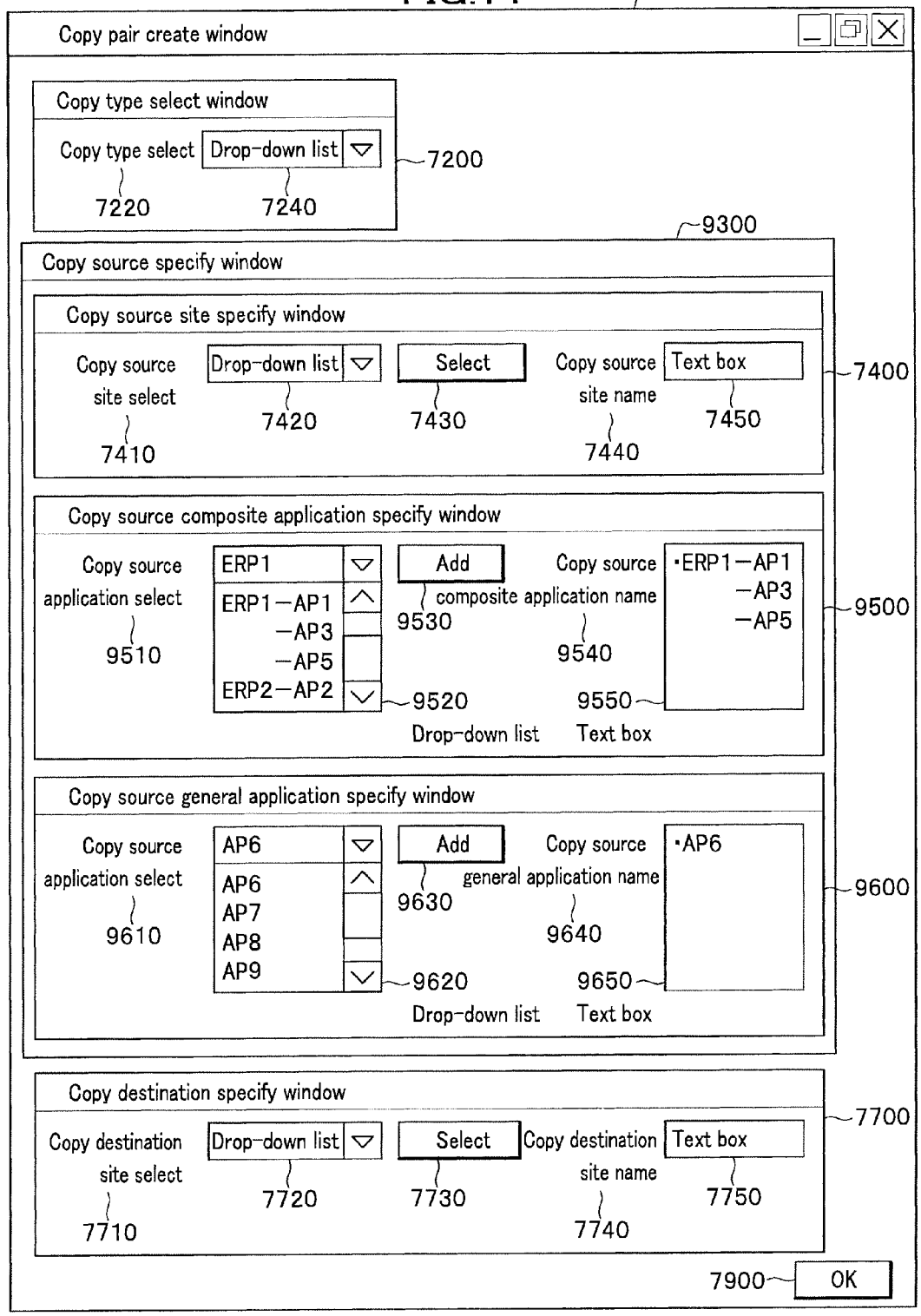
FIG. 14 is a diagram showing an example of a GUI according to the third embodiment.

FIG. 14 shows an example of a GUI according to the third embodiment. Next is described a difference between a copy pair create window 9000 of FIG. 14 in this embodiment and the copy pair create window 7000 of FIG. 9 in the first embodiment. The copy pair create window 9000 includes the copy type select window 7200, a copy source specify window 9300, the copy destination specify window 7700, and the OK button 7900. The copy type select window 7200 and the copy destination specify window 7700 are configured same as those of the copy pair create window 7000 shown in FIG. 9. Thus, only the copy source specify window 9300 is described in detail below.

The copy source specify window 9300 is a window for selecting an application as a copy source. The copy source specify window 9300 includes the copy source site specify window 7400, a copy source composite application specify window 9500, and a copy source general application specify window 9600. The copy source site specify window 7400 is configured same as that of the copy pair create window 7000 of FIG. 9. Thus, the copy source composite application specify window 9500 and copy source general application specify window 9600 are described below.

The copy source composite application specify window 9500 in the copy source specify window 9300 is a window for specifying a composite application as a copy source. A drop-down list 9520 displays a composite application included in a site displayed in the text box 7450. Note that the drop-down list 9520 also displays a sub-application constituting the composite application. However, such a sub-application (for example, AP1, AP3 and AP2) may preferably not be selected directly from the text box 7450. An add button 9530 is a button for adding the composite application selected from the drop-down list 9520 as a copy source composite application. A text box 9550 displays the name of the composite application selected from the drop-down list 9520 with the add button 9530.

The copy source general application specify window 9600 in the copy source specify window 9300 is a window for specifying a general application, that is, a non-composite application, as a copy source. A drop-down list 9620 indicates a general application at a site displayed in the text box 7450. Note that the drop-down list 9620 does not display a composite application displayed in the drop-down list 9520. An add button 9630 is a button for adding the general application selected from the drop-down list 9620 as a copy source general application. A text box 9650 displays the name of the general application selected from the drop-down list 9620 with the add button 9630.

The OK button 7900 is a button for determining creation of a copy pair configuration definition. If the user clicks the OK button 7900, the management program 1120 creates the copy pair configuration definition in which an application shown in the text box 9550 and the text box 9650 is the copy source and a site shown in the text box 7750 is the copy destination.

Below are described step-by-step operations for creating a copy pair configuration definition which are performed by a user using the GUI of FIG. 14, while focusing on a difference from the operations using the GUI of FIG. 9. First, a task as a copy source is determined. The user specifies a site as a copy source and then selects one or more applications constituting the task as the copy source. The operations of selecting the copy source site are the same as those shown in FIG. 10.

Next is determined a composite application as the copy source. The user selects a composite application as the copy source from the drop-down list 9520 in which composite applications at a site displayed in the text box 7450 are displayed and clicks the add button 9530, to thereby select the copy source composite application. The application determined as the copy source composite application is then displayed in the text box 9550. If the user wants to add another composite application as the copy source, the user once again selects a desired composite application from the drop-down list 9520 and clicks the add button 9530, to thereby add another application as a copy source.

Next is specified a site as a copy destination. The user selects a copy destination site from the drop-down list 7720 and clicks the select button 7730, to thereby determine the copy destination site. The determined copy destination site is displayed in the text box 7750. Next is determined a general application as a copy source. The user selects a general application as a copy source from the drop-down list 9620 in which general applications at a site displayed in the text box are displayed and clicks the add button 9630, to thereby determine the copy source general application. The determined copy source general application is displayed in the text box 9650. If the user wants to add another general application as the copy source, the user once again selects a desired general application from the drop-down list 9620 and clicks the add button 9630, to thereby add another copy source general application.

Then the copy destination site is specified with the same operations as those of FIG. 9. Finally, the user clicks the OK button 7900. This operation creates the copy pair configuration definition in which the application shown in the text box 9550 and the text box 9650 is the copy source and the site shown in the text box 7750 is the copy destination. In this embodiment, the composite application configuration table 8600 is separately provided from the application configuration table 1142 constituting the management table 1140. However, a table in which the composite application configuration table 8600 is combined with the application configuration table 1142 may be provided.

Next is described a flow of the processing in this embodiment with reference to FIG. 10. Herein is described only a difference from the processing shown in FIG. 10 in the first embodiment. In step S6510, the application configuration information acquisition unit 1122 in the management computer 1100 requests the application configuration information acquisition unit 1217 in the host computer 1200 according to the configuration shown in FIG. 1 to acquire the application configuration table 1280 and the composite application configuration table 8600.

In step S6550, the copy pair configuration definition creation unit 1129 references the composite application configuration table 8600 acquired from the host computer 1200. The GUI display unit 1127 displays a composite application (for example, see the drop-down list 9520 in FIG. 14) to the user. This operation can prevent the user from selecting a composite application as a copy source and copying a same volume in duplicate. Note that a general non-composite application is displayed to the user as in the first embodiment (for example, see the drop-down list 9620 in FIG. 14).

In this embodiment, even if the user specifies a composite application as a copy source, the user can determine a volume as a copy source without particularly specifying that the composite application is constituted by a plurality of sub-applications. For convenience of description, the plurality of sub-applications constituting the composite application are displayed but would not be selected. However, what is only necessary herein is to select a volume of a composite application without duplication, using information on the composite application. Therefore, any form of a display of the composite application to the user is available.

The processing described above allows to create the copy pair configuration definition without duplication or incompatibility even if an application as a copy source is a composite application.

Fourth Embodiment

A fourth embodiment describes that the present invention can be applied in a server virtualization environment. A technique of server virtualization can realize one or more virtual servers (or VMs: virtual machines) on one or more physical servers. The technique of server virtualization has been widely spread in recent years.

One of the characteristics of the technique of server virtualization is that a server virtualization program manages OS image, configuration information of a VM and its associated data. In some cases, all the data described above is managed as a single file. The configuration information includes information necessary for the VM to operate, such as, for example, the number of processors in a physical server, a memory size, and an operation rate of I/O processing capacity. Such characteristics of the technique of server virtualization allow a resource of a physical server to be used effectively, leading to an advantageous effect on reduction of cost in hardware and its management.

The server virtualization environment in this embodiment means an environment in which a server virtualization program is operated in a host computer, and a plurality of VMs can be operated on the program. In this embodiment, one application operates in one VM. However, any number of applications may operate in the present invention.

Figure 15:
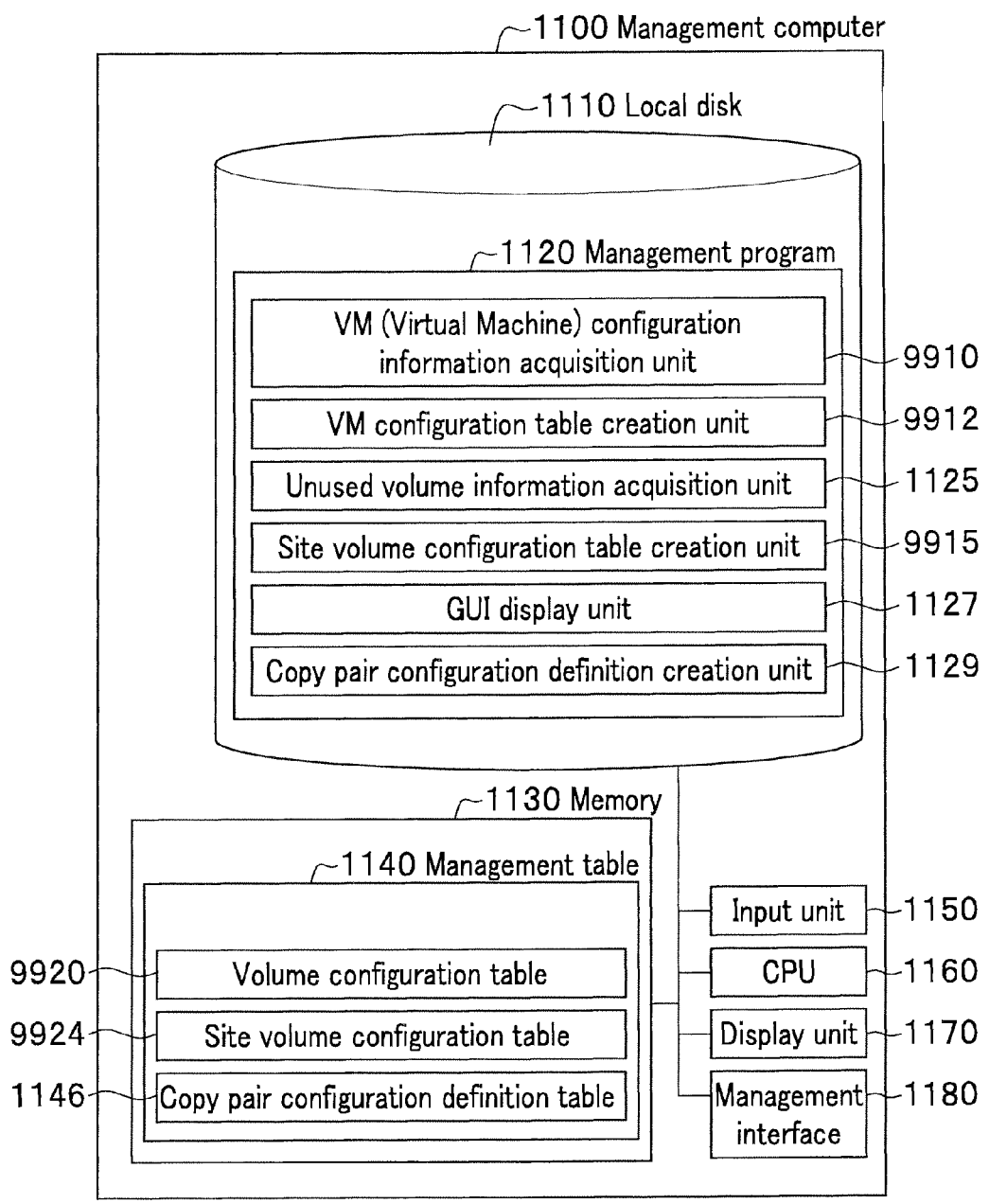
FIG. 15 is a diagram showing a configuration of a management computer according to a fourth embodiment.
Figure 16:
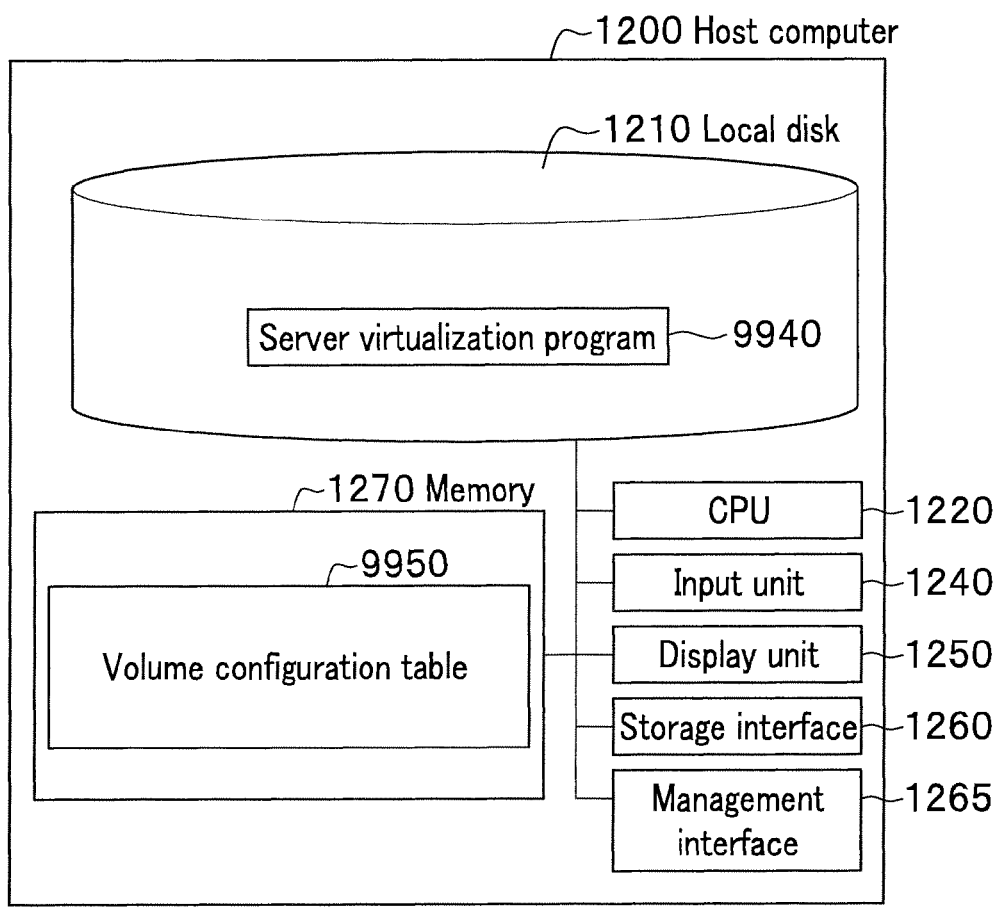
FIG. 16 is a diagram showing a configuration of a host computer according to the fourth embodiment.
Figure 17:
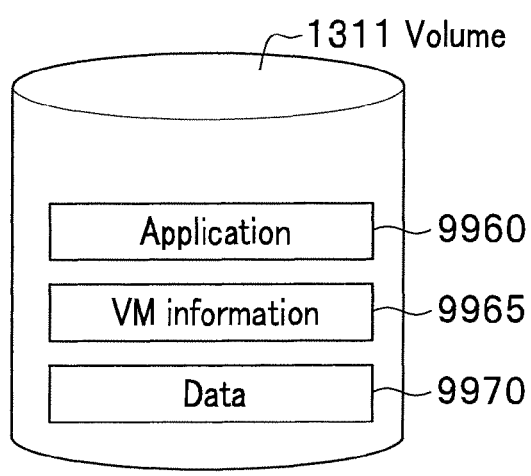
FIG. 17 is a diagram showing a configuration of a volume in a storage apparatus according to the fourth embodiment.

A configuration of a storage system according to this embodiment is shown in FIG. 1 (general configuration), FIG. 4 (storage apparatus 1300), FIG. 15 (management computer 1100), FIG. 16 (host computer 1200), and FIG. 17 (the volume 1311 in the storage apparatus 1300). The configurations shown in FIG. 1 and FIG. 4 in this embodiment are the same as those in the first embodiment. Next is described the storage system according to this embodiment, focusing on a difference from that according to the first embodiment.

FIG. 15 shows the configuration of the management computer 1100 in the fourth embodiment. The management computer 1100 in FIG. 15 has a same physical configuration as that of the management computer 1100 in FIG. 2. However, a processings performed by the management program 1120, and the management table 1140 in the memory 1270 according to this embodiment are different from those according to the first embodiment.

The management program 1120 includes a VM configuration information acquisition unit 9910, a VM configuration table creation unit 9912, the unused volume information acquisition unit 1125, a site volume configuration table creation unit 9915, the GUI display unit 1127, and the copy pair configuration definition creation unit 1129. The unused volume information acquisition unit 1125, GUI display unit 1127, and copy pair configuration definition creation unit 1129 have same configurations as those in the first embodiment. The VM configuration information acquisition unit 9910 acquires information on a volume used by a VM in the host computer 1200 at each site. The VM configuration table creation unit 9912 creates a VM configuration table 9920 (see FIG. 19) in which the information acquired by the VM configuration information acquisition unit 9910 is arranged. The site volume configuration table creation unit 9915 creates a site volume configuration table 9924 (see FIG. 20A and FIG. 20B) based on the VM configuration table 9920 created by the VM configuration table creation unit 9912 and the information acquired by the unused volume information acquisition unit 1125.

FIG. 16 shows a configuration of the host computer 1200 in the fourth embodiment. The host computer 1200 in FIG. 16 has a same physical configuration as that of the management computer 1200 in FIG. 3. However, data in the local disk 1210 and a table in the memory 1270 in this embodiment are different from those in the first embodiment.

The local disk 1210 is a disk unit connected to the host computer 1200, such as a hard disk drive and stores therein a server virtualization program 9940. The server virtualization program 9940 is loaded into the memory 1270 of the host computer 1200 and is executed by the CPU 1220. The server virtualization program 9940 is a program for acquiring information on an application operating on the host computer 1200 and a VM, based on instructions from the VM configuration information acquisition unit 9910 in the management computer 1100. The host computer 1200 executes the server virtualization program 9940, to thereby make a VM and an application stored in the storage apparatus 1300 connected to the host computer 1200 execute. The VM configuration table 9950 in the memory 1270 will be described later.

FIG. 17 shows a configuration of the volume 1311 in the storage apparatus 1300 according to the fourth embodiment. The volume 1311 in FIG. 17 corresponds to the volume 1311 in FIG. 4 in the disk unit 1310 of the storage apparatus 1300. The volume 1311 in FIG. 17 includes an application 9960, VM information 9965, and a data 9970. The VM information 9965 includes an OS image and configuration information. The data 9970 is used by the application 9960 or the like. For convenience of description, FIG. 17 shows that the single volume 1311 has one unit of the application 9960, VM information 9965, and a data 9970. However, a volume used by a VM may be a plurality of volumes. Or, an application, a VM, and a data may be stored in a plurality of volumes distributedly.

The application 9960 and the VM information 9965 are loaded into the memory 1270 in the host computer 1200 and are executed by the CPU 1220. The application 9960 and the VM information 9965 are a program and information each for executing a processing by reading and writing the data 9970 in the volume 1311 in the storage apparatus 1300.

FIG. 18 shows an example of the VM configuration table 9950 in the host computer 1200 in the fourth embodiment. The VM configuration table 9950 in the host computer 1200 at each site shown in FIG. 18 includes respective identifiers of a VM 9980 and a volume 9985 used by the VM. The VM 9980 stores therein an identifier of a VM which is operating in its host computer 1200 and is using a volume in the storage apparatus 1300. The volume 9985 used by the VM stores therein an identifier of a volume used by the VM shown in the VM 9980. In this embodiment, the server virtualization program 9940 can acquire information on the VM which is operating in its host computer 1200.

Reference numerals 9976 to 9978 indicate information on a volume used by a VM which operates in the host computer 1200 at the primary site 1700 in the storage system shown in FIG. 1. The reference numeral 9976 indicates that a VM referred to as VM1 uses only a volume referred to as VOL1. The reference numeral 9977 indicates that a VM referred to as VM2 uses only a volume referred to as VOL2. The reference numeral 9978 indicates that a VM referred to as VM3 uses two volumes referred to as VOL2 and VOL3. That is, VM2 and VM3 share VOL2.

FIG. 19 shows an example of the VM configuration table 9920 in the management computer 1100 according to the fourth embodiment. The VM configuration table 9920 in the management computer 1100 includes respective identifiers of a VM 9995, a site 10000, a host 10005, and a volume 10010 used by the VM. The VM 9995 stores an identifier of a VM. The site 10000 stores an identifier of a site to which the VM shown at the VM 9995 belongs. The host 10005 stores an identifier of a host in which the VM shown at the VM 9995 is operating. The volume used by the VM 10100 stores an identifier of a used volume of the VM shown at the VM 9995. Information constituting the VM configuration table 9920 is acquired by the VM configuration information acquisition unit 9910 in the management computer 1100 from the host computer 1200 in the configuration as shown in FIG. 1. In this embodiment, it is assumed that there are two sites, the primary site 1700 and the remote site 1800. The VM configuration information acquisition unit 9910 acquires the VM configuration table 9975 in the host computer 1200 at each site and creates the VM configuration table 9920 from the acquired VM configuration table 9975.

Reference numerals 9991 to 9993 indicate information on a VM in the host computer 1200 at the primary site 1700 and the remote site 1800 in the storage system having the configuration shown in FIG. 1. The reference numeral 9991 indicates that a VM referred to as the VM1 belongs to a site referred to as Site A, operates in the host computer 1200 referred to as Host A, and uses only a volume referred to as VOL1. The reference numeral 9992 indicates that a VM referred to as VM2 belongs to a site referred to as Site A, operates in the host computer 1200 referred to as Host A, and uses only a volume referred to as VOL2. The reference numeral 9993 indicates that a VM referred to as VM3 belongs to a site referred to as Site A, operates in the host computer 1200 referred to as Host A, and uses two volumes referred to as VOL2 and VOL3. That is, VM2 and VM3 share VOL2.

FIG. 20A shows an example of the primary site volume configuration table 9924A stored in the management computer 1100 according to the fourth embodiment. FIG. 20B shows an example of the remote site volume configuration table 9924B stored in the management computer 1100. The primary site volume configuration table 9924A and the remote site volume configuration table 9924B are tables constituting the volume configuration table 9924 at each site in this embodiment.

In FIG. 20A, the primary site volume configuration table 9924A includes respective identifiers of the primary site volume 5600 and of a VM 10200 which is using a volume. The primary site volume 5600 stores therein an identifier of a volume present at the primary site 1700. The VM 10200 which is using a volume stores therein an identifier of a VM using a volume shown at the primary site volume 5600. The site volume configuration table creation unit 9915 acquires information on a volume used by the VM from the VM configuration table 9920 and also acquires information on a volume not used by the VM from the unused volume information acquisition unit 1125. This enables the management computer 1100 to acquire information on all the volumes at the primary site 1700.

Reference numerals 10210 to 10240 each indicate information on a volume present in the storage apparatus 1300 at the primary site 1700 in the storage system having the configuration shown in FIG. 1. The reference numeral 10210 indicates that a volume referred to as VOL1 is used by a VM referred to as VM1. The reference numeral 10220 indicates that a volume referred to as VOL2 is used by two VMs referred to as VM2 and VM3. That is, VM2 and VM3 share VOL2. The reference numeral 10230 indicates that a volume referred to as VOL3 is used by a VM referred to as VM3. The reference numeral 10240 indicates that a volume referred to as VOL4 is an unused volume.

In FIG. 20B, the remote site volume configuration table 9924B includes respective identifiers of a remote site volume 6100 and a volume using VM 10700. The remote site volume 6100 stores therein a volume present at the remote site 1800. The volume using VM 10700 stores therein a VM using a volume shown at the remote site volume 6100. Similarly to the primary site volume configuration table 9924A of FIG. 20A, the site volume configuration table creation unit 9915 acquires information on a volume used by the VM from the VM configuration table 9920 and also acquires information on a volume used by the VM from the unused volume information acquisition unit 1125. In this embodiment, it is assumed that the remote site 1800 is a site to be used as a copy destination. Thus, any volume at the remote site 1800 is unused. In the present invention, however, any site having a necessary and sufficient unused volume may be set as a copy destination, whether or not a VM is running at the site of interest.

Reference numerals 10510 to 10540 each indicate information on a volume present in the storage apparatus 1300 at the remote site 1800 in the storage system having the configuration shown in FIG. 1. Reference numerals 10510, 10520, 10530 and 10540 indicate that the volumes VOL1, VOL2, VOL3 and VOL4 are unused, respectively.

Figure 21:
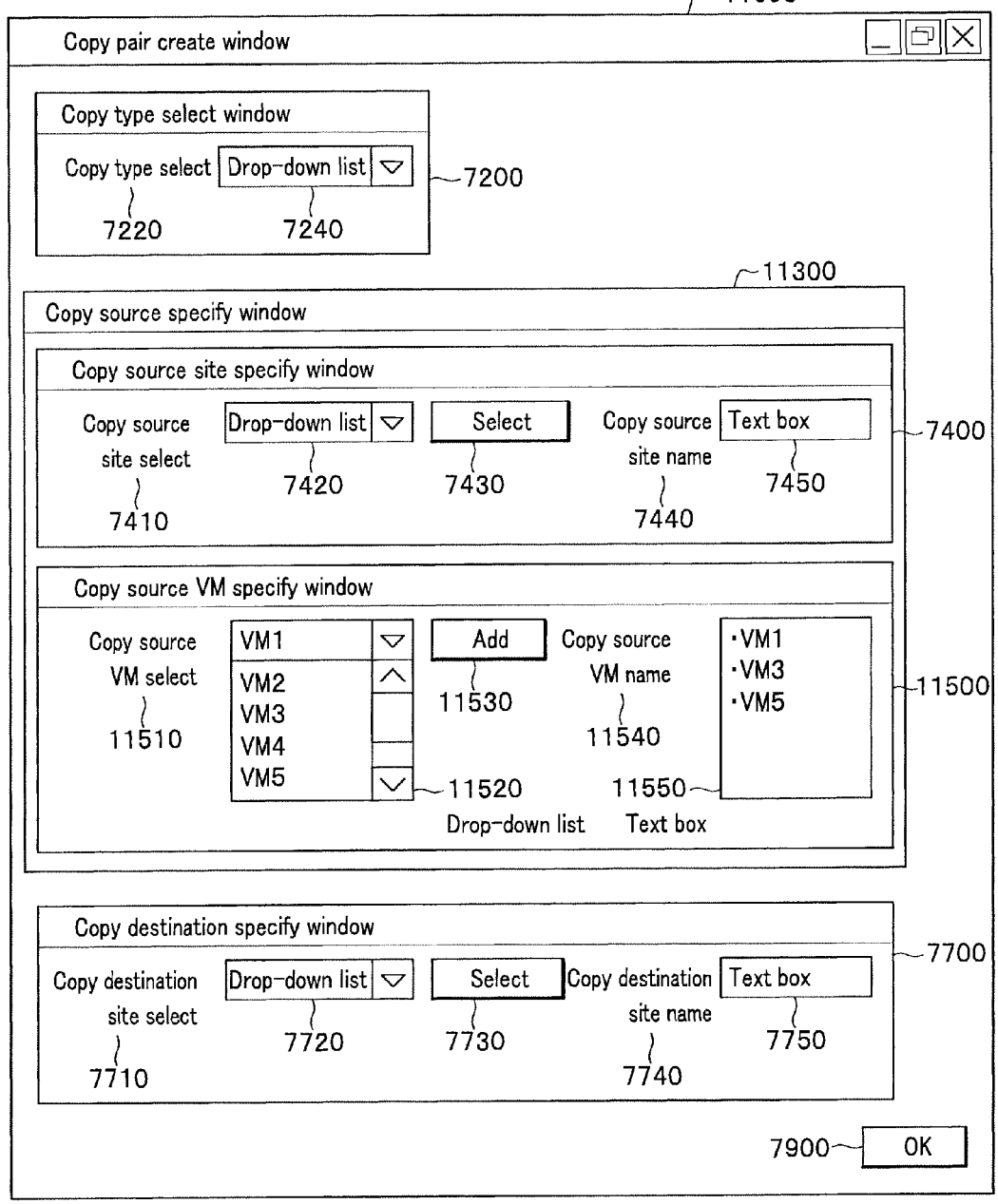
FIG. 21 is a diagram showing an example of a GUI according to the fourth embodiment.

FIG. 21 shows an example of the GUI according to the fourth embodiment. Herein is described only a difference between the copy pair create window 11000 in FIG. 21 and the copy pair create window 7000 in FIG. 9. The copy pair create window 11000 includes the copy type select window 7200, a copy source specify window 11300, the copy destination specify window 7700, and the OK button 7900. The copy type select window 7200 and the copy destination specify window 7700 are configured same as those in the copy pair create window 7000 shown in FIG. 9. Thus, only the copy source specify window 11300 is described below in detail.

The copy source specify window 11300 is a window for selecting a VM as a copy source. The copy source specify window 11300 includes the copy source site specify window 7400 and a copy source VM specify window 11500. The copy source site specify window 7400 is configured same as the copy pair create window 7000 shown in FIG. 9. Thus only the copy source VM specify window 11500 is described below.

The copy source VM specify window 11500 in the copy source specify window 11300 is a window for specifying a VM as a copy source. A drop-down list 11520 displays a VM at a site displayed in the text box 7450. An add button 11530 is a button for adding the VM selected from the drop-down list 11520 as a copy source VM. A text box 11550 displays the name of the copy source VM selected from the drop-down list 11520 with the add button 11530.

Below are described step-by-step operations for creating a copy pair configuration definition in this embodiment, showing a difference from the operations according to the first embodiment shown in FIG. 9. First, a task of a copy source is determined. A user specifies a site as a copy source and selects a VM constituting the task as a copy source. The operations of selecting the copy source site are the same as those shown in FIG. 9.

Next is determined a VM as a copy source. The user selects a VM as a copy source from the drop-down list 11520 in which a VM at the site displayed in the text box 7450 is displayed and clicks the add button 11530, to thereby determine the copy source VM. The determined copy source VM is displayed in the text box 11550. If the user wants to add another copy source VM, the user once again selects a desired VM to be added from the drop-down list 11520 and clicks the add button 11530, to thereby add another copy source VM.

Next is specified a copy destination site. The user selects a site as a copy destination from the drop-down list 7720 and clicks the select button 7730, to thereby determine the copy destination site. The determined copy destination site is displayed in the text box 7750.

Finally, the use clicks the OK button 7900. This operation makes the management program 1120 create a copy pair configuration definition in which the VM displayed in the text box 11550 is the copy source, and the site displayed in the text box 7750 is the copy destination.

Figure 22:
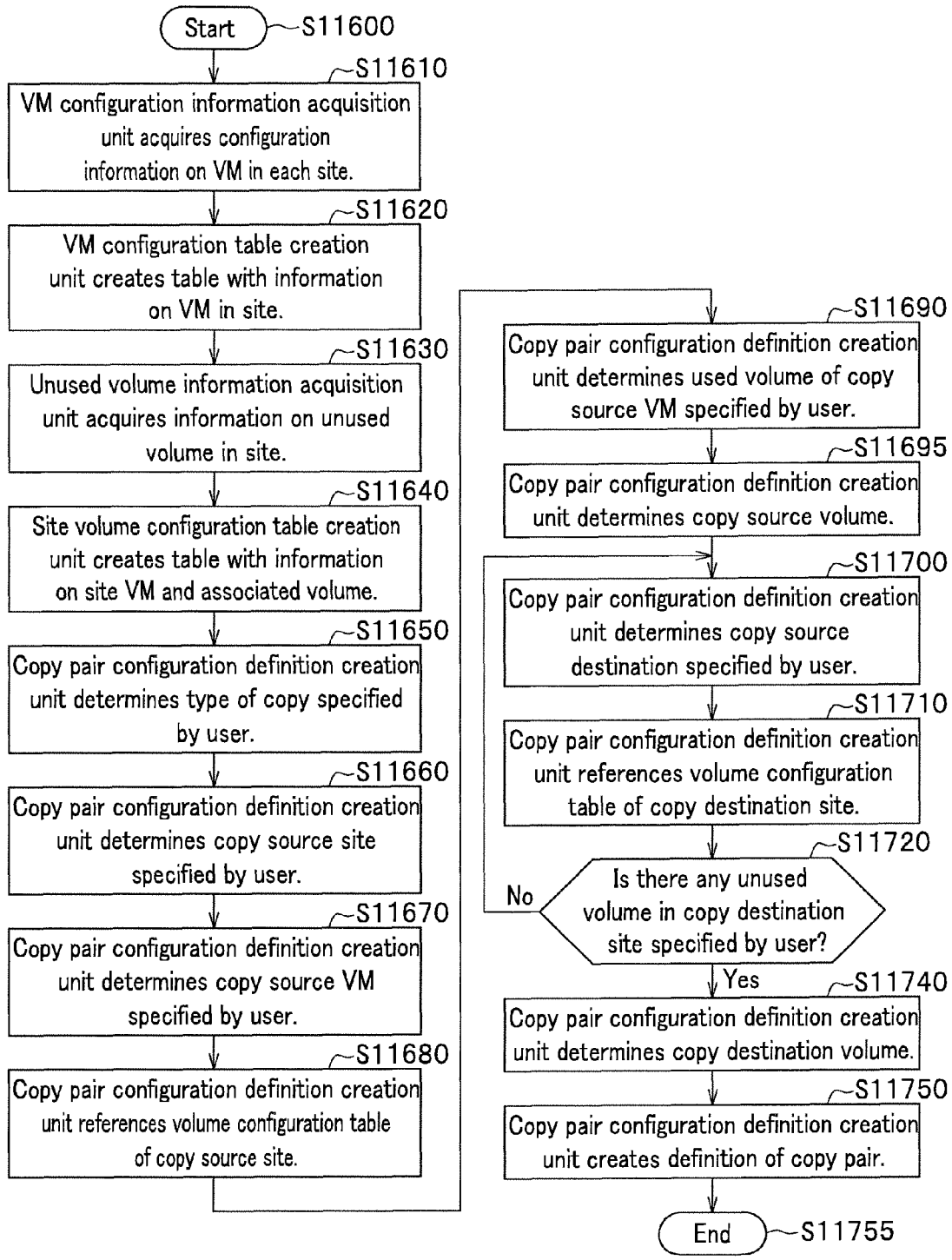
FIG. 22 is a flowchart showing a processing of copy pair configuration definition creation according to the fourth embodiment.

FIG. 22 is a flowchart showing a processing of copy pair configuration definition creation according to the fourth embodiment. The processing of copy pair configuration definition creation which is executed by the management program 1120 in the management computer 1100 shown in FIG. 22 is similar to the processing shown in FIG. 10, if the term "application" in FIG. 10 is substituted for the term "VM" in FIG. 22. Below is described the processing in detail.

The processing starts at step S11600. In step S11610, the VM configuration information acquisition unit 9910 acquires VM configuration information at each site. More specifically, the VM configuration information acquisition unit 9910 requests the server virtualization program 9940 in the host computer 1200 included in the configuration shown in FIG. 1 to acquire the VM configuration table 9950 in which information on a VM in the host computer 1200 is managed. In step S11620, the VM configuration table creation unit 9912 creates the VM configuration table 9920 in which information on a site to which the VM belongs and information on a host in operation is arranged, from the received VM configuration table 9950.

In step S11630, the unused volume information acquisition unit 1125 requests the storage microprogram 1330 in the storage apparatus 1300 to acquire a name of a site connected to the management computer 1100 and a usage condition of a volume at the site. In step S11640, the site volume configuration table creation unit 9915 creates the site volume configuration table 9924 in which a relation between the VM at the site and the volume is arranged, based on the VM configuration table 9920 created in step S11620 and the usage condition of the storage received in step S11630. In step S11650, the copy pair configuration definition creation unit 1129 determines a copy type specified by the user and acquired via the GUI display unit 1127.

In step S11660, the GUI display unit 1127 displays a list of sites included in the configuration shown in FIG. 1 to the user. The user specifies a site from the list. The copy pair configuration definition creation unit 1129 determines the site as a copy source site. In step S11670, the GUI display unit 1127 displays, to the user, VMs present at the site determined by the copy pair configuration definition creation unit 1129 in step S11660. The copy pair configuration definition creation unit 1129 determines a plurality of the VMs specified by the user as copy source VMs. Generally, replication as described above is performed by a task as a unit. A task is typically constituted by a plurality of applications, each of which runs in a VM on a one-to-one basis. Thus, a plurality of VMs can be specified herein as copy sources.

In step S11680, the copy pair configuration definition creation unit 1129 references the volume configuration table 9924 at the site created in step S11640. In step S11690, the copy pair configuration definition creation unit 1129 selects a volume used by the VM determined in step S11670 without duplication. In step S11695, the copy pair configuration definition creation unit 1129 determines the volume selected in step S11690 as a copy source volume.

In step S11700, the GUI display unit 1127 displays a site included in the configuration shown in FIG. 1 to the user. The copy pair configuration definition creation unit 1129 determines the site specified by the user from among the sites acquired via the GUI display unit 1127, as a copy destination site. In step S11710, the copy pair configuration definition creation unit 1129 references the volume configuration table 9924 at the site created in step S11640. In step S11720, the copy pair configuration definition creation unit 1129 determines whether or not there is a volume having a capacity equal to or more than a capacity of the copy source volume determined in step S11695, at the site determined in step S11700.

In step S11740, if there is an unused volume having a capacity equal to or more than a capacity of the copy source volume determined in step S11695, at the site determined in step S11700 (Yes in step S11720), the copy pair configuration definition creation unit 1129 determines the volume as the copy destination volume.

In step S11700, if there is not an unused volume having a capacity equal to or more than a capacity of the copy source volume determined in step S11695, at the site determined in step S11700 (No in step S11720), the GUI display unit 1127 again displays the site included in the configuration shown in FIG. 1 to the user. The copy pair configuration definition creation unit 1129 determines the site specified by the user as the copy destination site.

In step S11750, the copy pair configuration definition creation unit 1129 creates a copy pair configuration definition in which the volume determined in step S11695 is the copy source, and the volume determined in step S11740 is the copy destination. In step S11755, the processing of copy pair configuration definition creation terminates.

In the present invention, a VM is specified as a copy source. This makes it possible to create a copy pair configuration definition without duplication or incompatibility. Creation of the copy pair configuration definition by a VM as a unit allows a batch copy of OS images and configuration information on a VM, an application operating in the VM, and its associated data. Thus, a task as a copy source can be performed without configuration information, installing an application, or any other works at a copy destination.

Fifth Embodiment

The fourth embodiment has described that a copy pair can be created in a plurality of VMs constituting a task, by the task as a unit. A fifth embodiment describes that, in a server virtualization environment, a copy pair configuration definition can be created by a site as a unit as described in the first embodiment. The site used in the fifth embodiment means a set configured by the host computer 1200, the storage apparatus 1300, and the data network 1500 for connecting the former two, in the server virtualization environment described in the fourth embodiment.

It is advantageous to construct a replication environment by the site because, if a disaster recovery is performed at a site, many users want to protect all tasks rather than a specific task at the site. In the present invention, a site is specified as a copy source. This makes it possible to create a copy pair configuration definition without duplication or incompatibility. Additionally, after a copy source is specified by the site, an unnecessary VM among VMs at the specified site can be deleted from the copy source. This allows a further effective replication.

Creation of a copy pair configuration definition by the site allows a bulk copy of OS images and configuration information on a VM, an application operating in the VM, and its associated data. Thus, a configuration of a site as a copy source can be created without configuration information, installing an application, or any other works at a copy destination. Note that a configuration of the storage system in this embodiment is the same as that in the fourth embodiment.

Figure 23:
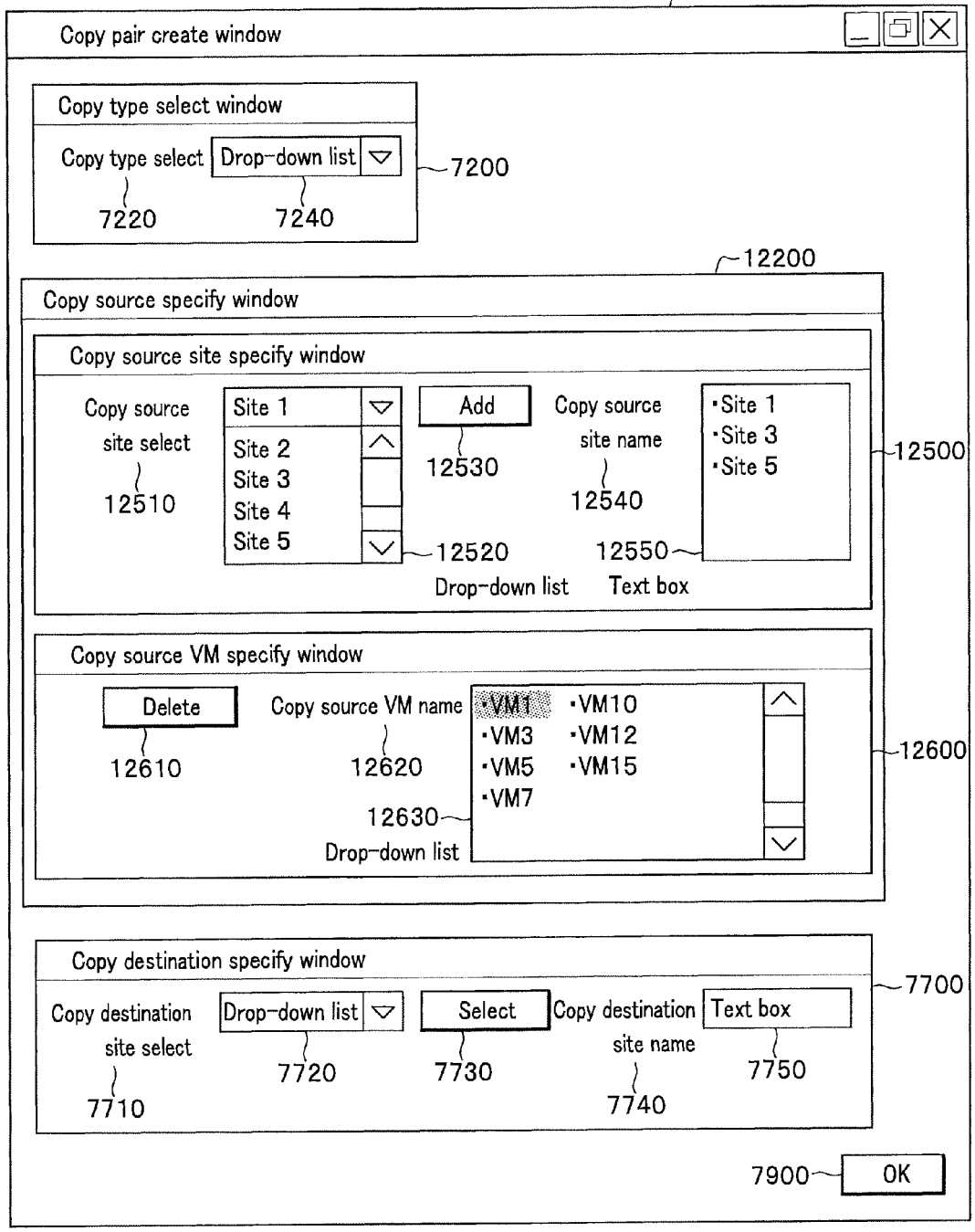
FIG. 23 is a diagram showing an example of a GUI according to a fifth embodiment.

FIG. 23 shows an example of a GUI according to the fifth embodiment. In FIG. 23, the copy pair create window 12000 includes the copy type select window 7200, a copy source specify window 12200, the copy destination specify window 7700, and the OK button 7900. The copy type select window 7200 and the copy destination specify window 7700 are configured same as those in the first embodiment. Thus, only the copy source specify window 12200 is described below in detail.

The copy source specify window 12200 is a window for selecting a site as a copy source. The copy source specify window 12200 includes a copy source site specify window 12500 and a copy source VM specify window 12600. The copy source site specify window 12500 is a window for specifying a site as a copy source. A drop-down list 12520 displays a site shown at the site 10000 in the VM configuration table 9920 of FIG. 19 as a candidate copy destination. An add button 12530 is a button for adding the site selected from the drop-down list 12520 as a copy source site. A text box 12550 displays the name of the site added from the drop-down list 12520 with the add button 12530.

The copy source VM specify window 12600 is a window for specifying a VM as a copy source. A copy source VM name 12620 indicates that a name of the copy source VM is displayed. A text box 12630 to the right of the copy source VM name 12620 displays a VM included in the site displayed in the text box 12550. A delete button 12610 is a button for deleting a VM selected from among one or more VMs displayed in the text box 12630. The delete button 12610 can eliminate an unnecessary VM as a copy source from a plurality of VMs at the site specified in the copy source site specify window 12500.

Below are described step-by-step operations for creating a copy pair configuration definition in this embodiment with reference to FIG. 23, showing a difference from the operations shown in FIG. 9 in the first embodiment. First, a task as a copy source is determined. A user specifies a site as a copy source and deletes, if needed, an unnecessary VM from among one or more VMs included in the selected site. Next is determined a site as a copy source. The user selects a site as the copy source from among one or more sites displayed in the drop-down list 12520 and clicks the add button 12530, to thereby determine the site as the copy source.

If the user wants to add another copy source site, the user once again selects a desired site to be added from the drop-down list 12520 and clicks the add button 12530, to thereby add another copy source site. If the user wants to delete an unnecessary VM from among the VMs at the site, the user selects a VM to be deleted from the text box 12630 and clicks the delete button 12610, to thereby delete the unnecessary VM.

Next is specified a copy destination site, operations of which are the same as those shown in FIG. 9 in the first embodiment. Finally, the user clicks the OK button 7900. This operation makes the management program 1120 create a copy pair configuration definition in which the VM shown in the text box 12630 is the copy source, and the site shown in the text box 7750 is the copy destination.

Figure 24:
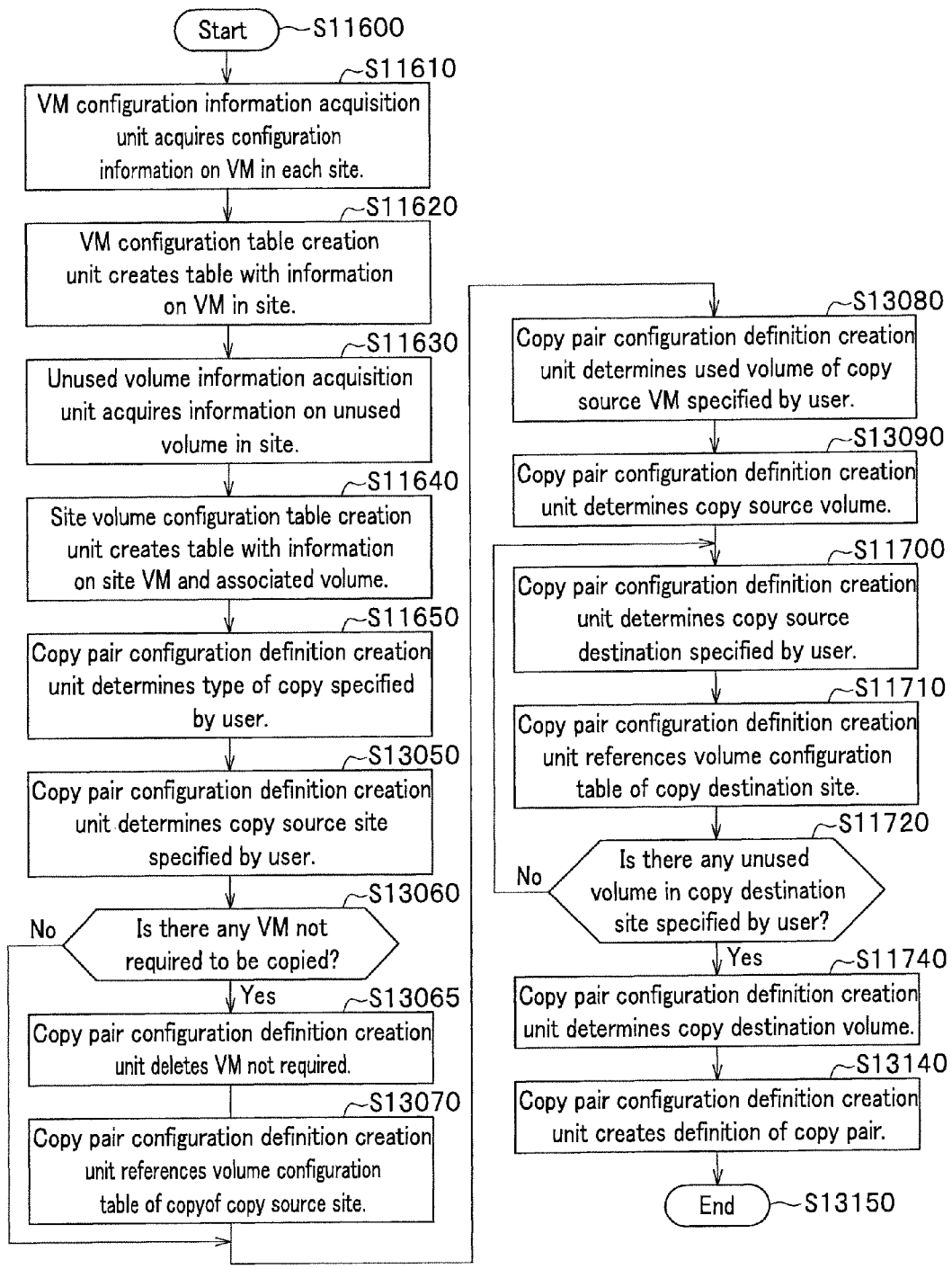
FIG. 24 is a flowchart showing a processing of copy pair configuration definition creation according to the fifth embodiment.

FIG. 24 is a flowchart showing a processing of copy pair configuration definition creation according to the fifth embodiment. The processing is described below with reference also to FIG. 1 where necessary. The processing of copy pair configuration definition creation which is executed by the management program 1120 in the management computer 1100 shown in FIG. 24 is described below in detail, while showing a difference from the processing shown in FIG. 22 in the fourth embodiment.

The processing in this embodiment is the same as that in the fourth embodiment from step S11600 at which the processing starts, to step S11650 in which the copy pair configuration definition creation unit 1129 determines a copy type. Thus, the processing after step S11650 is described below.

In step S13050, the GUI display unit 1127 displays a list of one or more sites included in the configuration shown FIG. 1 to the user. The copy pair configuration definition creation unit 1129 determines one or more sites specified therefrom by the user as a copy source. In step S13060, the GUI display unit 1127 displays one or more VMs present at the site determined in step S13050 to the user and makes the user determine whether or not there is a VM unnecessary to be copied from among the displayed VMs. In step S13065, if there is a VM unnecessary to be copied (Yes in step S13060), the copy pair configuration definition creation unit 1129 deletes the unnecessary VM from the copy source VM. If there is not a VM unnecessary to be copied (No in step S13060), the processing proceeds with step S13070.

In step S13070, the copy pair configuration definition creation unit 1129 references the volume configuration table 9924 at the site created in step S11640. In step S13080, the copy pair configuration definition creation unit 1129 selects a volume used by the VM not deleted in step S13065 without duplication. In step S13090, the copy pair configuration definition creation unit 1129 determines the volume selected in step S13080 as a copy source volume.

The processing in this embodiment is the same as that in the fourth embodiment from step S11700 in which the copy source site is specified, to step S11740 in which the copy destination volume is determined.

In step S13140, the copy pair configuration definition creation unit 1129 creates a copy pair configuration definition in which the volume determined in step S13090 is the copy source, and the volume determined in step S11740 is the copy destination. In step S13150, the processing of copy pair configuration definition creation terminates.

In the present invention, a site is specified as a copy source. This makes it possible to create a copy pair configuration definition without duplication or incompatibility.

In this embodiment, the management computer 1100 consolidates management of a usage condition of a volume from the host computer 1200 and the storage apparatus 1300 at each site and prevents a volume from duplicating among applications as a copy source. This makes it possible to select a used volume of an application as a copy source without excess or deficiency. Further, in this embodiment, if a replication environment is constructed in a large-scale storage system, management of a usage condition of a volume in the host computer 1200 and the storage apparatus 1300 at each site is consolidated. This makes it possible to create a copy pair configuration definition by the task which is constituted by a plurality of applications. That is, even if a plurality of applications share a single and same volume, a replication environment can be constructed by the task without causing such problems as a redundant configuration and inconsistent data between applications.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A management computer, for use in a context wherein one or more host computers and one or more storage apparatuses communicate with each other via a first network, and wherein the one or more host computers and the one or more storage apparatuses communicating with the management computer via a second network, the management computer configured to acquire an application configuration information identifying via the second network, a volume of one of the storage apparatuses used by an application in the host computer, the management computer further configured to create management computer application configuration information identifying a volume of one of the storage apparatuses used by the host computer, using the acquired application configuration information, and configured to store the created management computer application configuration information in a memory unit, the management computer configured to acquire information on an unused volume in each of the storage apparatuses via the second network from each of the storage apparatuses, the management computer configured to create volume configuration information in which the created management computer application configuration information and the acquired information on the unused volume is arranged, and configured to store the created volume configuration information in the memory unit, the management computer configured to create a configuration definition of a copy pair including an original volume into which data in the host computer is written and a duplicated volume into which data is copied, and configured to store the copy pair configuration definition in the memory unit, and the management computer configured to select, upon specification of a group constituted by a plurality of applications as a copy source by an input unit, a volume used by the specified group without duplication by referencing the volume configuration information, and configured to determine the selected volume as a copy source volume, also configured to determine the unused volume as a copy destination volume, and configured to create copy pair configuration definition information associating the copy source volume with the copy destination volume.

2. The management computer according to claim 1, wherein the group is constituted by one or more applications constituting a task.

3. The management computer according to claim 1, further comprising the management computer configured so that if the management computer determines from the application configuration information that an application has a cluster configuration, then management computer displays a name of an active application among two or more applications configuring the cluster.

4. The management computer according to claim 1, further comprising the management computer configured so that, if the application is a composite application constituted by a plurality of sub-applications, the management computer creates composite application configuration information associating a name of the composite application with names of the sub-applications constituting the composite application, and stores the created composite application configuration information in the memory unit, and the management computer is further configured to display the name of the composite application on the display unit.

5. The management computer according to claim 4, wherein the group is included in the composite application.

6. The management computer according to claim 1,
wherein the storage system has a plurality of sites at each of which the one or more host computers and the one or more storage apparatuses communicate with each other via the first network, and
wherein the management computer is configured to determine a volume at a site other than the site having the copy source volume, as the copy destination volume.

7. A method for use with a system of one or more host computers; one or more storage apparatuses, and a management computer, wherein the one or more host computers and the one or more storage apparatuses communicating with each other via a first network, wherein the one or more host computers and the one or more storage apparatuses communicating each with the management computer via a second network, comprising:
acquiring, using one or more computers, information on a virtual machine in the host computer and a used volume in the virtual machine;
creating, using the one or more computers, virtual machine configuration information that associates the information on the virtual machine and the information on the used volume, and storing the virtual machine configuration information in a memory unit;
acquiring, using the one or more computers, information on an unused volume from the storage apparatus;
creating, using the one or more computers, volume configuration information in which the virtual machine configuration information and the information on an unused volume is arranged, and storing the created volume configuration information in the memory unit;
creating, using the one or more computers, a configuration definition of a copy pair including an original volume into which data in the virtual computer is written and a duplicated volume into which data is copied, and storing the copy pair configuration definition in the memory unit; and
selecting, using the one or more computers, upon specification of the virtual machine as a copy source by an input unit, a volume used by the specified virtual machine without duplication by referencing the volume configuration information, determining the selected volume as a copy source volume, and also determining the unused volume as a copy destination volume, and creating copy pair configuration definition information associating the copy source volume with the copy destination volume.

8. The method according to claim 7, wherein the storage system has a plurality of sites at each of which the one or more host computers and the one or more storage apparatuses communicate with each other via the first network.

9. The method according to claim 8, further comprising determining, using the one or more computers, a volume at a site other than the site having the copy source volume, as the copy destination volume.

10. The method according to claim 8, further comprising displaying, if the input unit selects one or more sites as a copy source, a name of the virtual machine at the selected site on a display unit by referencing the volume configuration information, and also displaying one or more sites as a copy destination on the display unit.

11. A management computer, for use in a context
wherein one or more host computers and one or more storage apparatuses communicate with each other via a first network,
wherein the one or more host computers and the one or more storage apparatuses communicate each with the management computer via a second network, wherein the management computer acquires information on a virtual machine in the host computer and a used volume in the virtual machine, wherein the management computer creates virtual machine configuration information associating the information on the virtual machine and the used volume acquired by the virtual machine configuration information acquisition unit, and storing the virtual machine configuration information in a memory unit, wherein the management computer acquires information on an unused volume from the storage apparatus, wherein the management computer creates volume configuration information in which the virtual machine configuration information and the information on an unused volume acquired by the unused volume information acquisition unit is arranged, and storing the created volume configuration information in the memory unit, wherein the management computer creates a configuration definition of a copy pair including an original volume into which data in the virtual computer is written and a duplicated volume into which data is copied, and storing the copy pair configuration definition in the memory unit, and wherein, upon specification of the virtual machine as a copy source by an input unit, wherein the management computer selects a volume used by the specified virtual machine without duplication by referencing the volume configuration information, determines the selected volume as a copy source volume, also determines the unused volume as a copy destination volume, and creates copy pair configuration definition information associating the copy source volume with the copy destination volume.

12. The management computer according to claim 11, wherein the management computer is included in a storage system that has a plurality of sites at each of which the one or more host computers and the one or more storage apparatuses communicate with each other via the first network.

13. The management computer according to claim 11, wherein the management computer determines a volume at a site other than the site having the copy source volume, as the copy destination volume.

14. The management computer according to claim 11, wherein, if the input unit selects one or more sites as a copy source, the management computer displays a name of the virtual machine at the selected site on a display unit by referencing the volume configuration information, and also displays one or more sites as a copy destination on the display unit.

* * * * *